United States Patent
Nogami et al.

(10) Patent No.: US 8,472,954 B2
(45) Date of Patent: Jun. 25, 2013

(54) BASE STATION DEVICE, MOBILE STATION DEVICE, COMMUNICATION SYSTEM, AND COMMUNICATION METHOD

(75) Inventors: Toshizo Nogami, Osaka (JP); Tatsushi Aiba, Osaka (JP); Shohei Yamada, Osaka (JP); Hidekazu Tsuboi, Osaka (JP); Katsunari Uemura, Osaka (JP); Daiichiro Nakashima, Osaka (JP); Shoichi Suzuki, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 43 days.

(21) Appl. No.: 13/141,659

(22) PCT Filed: Nov. 9, 2009

(86) PCT No.: PCT/JP2009/005965
§ 371 (c)(1),
(2), (4) Date: Jun. 22, 2011

(87) PCT Pub. No.: WO2010/073468
PCT Pub. Date: Jul. 1, 2010

(65) Prior Publication Data
US 2011/0256868 A1 Oct. 20, 2011

(30) Foreign Application Priority Data

Dec. 26, 2008 (JP) ................................. 2008-331652

(51) Int. Cl.
*H04W 60/00* (2009.01)
(52) U.S. Cl.
USPC ...................................... 455/435.1; 370/350
(58) Field of Classification Search
USPC ............. 455/561, 435.1, 432.1, 436; 370/350
See application file for complete search history.

(56) References Cited

U.S. PATENT DOCUMENTS

| 2008/0080476 A1* | 4/2008 | Cho et al. ....................... 370/350 |
| 2009/0262712 A1 | 10/2009 | Seyama et al. |

FOREIGN PATENT DOCUMENTS

| WO | WO 2008/013404 A1 | 1/2008 |
| WO | WO 2008/081535 A1 | 7/2008 |

OTHER PUBLICATIONS

3GPP TS 36.211 V8.4.0 (Sep. 2008), "3rd Generation Partnership Project; Technical Specification Group Radio Access Network; Evolved Universal Terrestrial Radio Access (E-UTRA); Physical Channels and Modulation", (Release 8).

(Continued)

*Primary Examiner* — Phuoc Doan
(74) *Attorney, Agent, or Firm* — Birch, Stewart, Kolasch & Birch, LLP

(57) ABSTRACT

A communication system which performs communication between a base station device configuring at least one cell and a mobile station device, wherein: the base station device includes: a synchronization signal generation unit which generates a synchronization signal corresponding to a cell identity for identifying a cell; and a transmission unit which generates a first transmission signal including the synchronization signal using a first parameter obtained from the cell identity, generates a second transmission signal excluding the synchronization signal using a second parameter obtained from a virtual cell identity different from the cell identity, transmits the first transmission signal using a first frequency band, and transmits the second transmission signal via a second frequency band different from the first frequency band. The mobile station device includes: a reception unit which receives a first reception signal including the synchronization signal using the first parameter obtained from the cell identity via the first frequency band and receives a second reception signal using the second parameter obtained from the virtual cell identity via the second frequency band.

20 Claims, 20 Drawing Sheets

OTHER PUBLICATIONS

3GPP TS 36.300 V8.4.0 (Mar. 2008), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description", Stage 2, (Release 8).

3GPP TSG RAN WG1 #55, "Issues on the physical cell ID allocation to the aggregated component carriers", LG Electronics, R1-084195.

3GPP TSG RAN WG1 Meeting #55, "Initial Access Procedure for Asymmetric Wider Bandwidth in LTE-Advanced", NTT DOCOMO, R1-084249, Nov. 10-14, 2008.

3GPP TSG RAN WG1 Meeting #55, "Non-backward compatible component carriers for asymmetric carrier aggrigation", Panasonic, R1-084221, Nov. 10-14, 2008.

3GPP TSG-RAN WG1 Meeting #55, "MAC to physical layer mapping and control signaling for carrier aggregation", Panasonic, R1-084222.

International Search Report, PCT/JP2009/005965, Jan. 12, 2010.

* cited by examiner

BASE STATION DEVICE, MOBILE STATION DEVICE, COMMUNICATION SYSTEM, AND COMMUNICATION METHOD

TECHNICAL FIELD

The present invention relates to a base station device, a mobile station device, a communication system, and a communication method.

This application claims priority to and the benefits of Japanese Patent Application No. 2008-331652 filed on Dec. 26, 2008, the disclosure of which is incorporated herein by reference.

BACKGROUND ART

3GPP (Third Generation Partnership Project) is a project in which specifications of mobile phone systems based on an evolved network of W-CDMA (wideband code division multiple access) and a GSM (global system for mobile communications) are studied and created.

In 3GPP, a W-CDMA scheme has been standardized as a $3^{rd}$ generation cellular mobile communication scheme and its services have been sequentially initiated. Also, HSDPA (high-speed downlink packet access) having a higher communication rate has been standardized and its services have been initiated.

In 3GPP, EUTRA (evolved universal terrestrial radio access), which is the evolution of 3G radio access technology, has been studied.

FIG. 20 shows radio channels in EUTRA. A physical broadcast channel (PBCH), a physical downlink control channel (PDCCH), a physical downlink shared channel (PDSCH), a physical multicast channel (PMCH), a physical control format indicator channel (PCFICH), and a physical hybrid automatic repeat request (ARQ) indicator channel (PHICH) are used in a downlink through which signals are transmitted from a base station device 100' to mobile station devices 200'a to 200'c.

In EUTRA, a physical uplink shared channel (PUSCH), a physical uplink control channel (PUCCH), and a physical random access channel (PRACH) are used in an uplink through which signals are transmitted from the mobile station devices 200'a to 200'c to the base station device 100'.

FIGS. 2 and 3 are diagrams showing a method of arranging a physical resource block (PRB), which is an allocation unit for a user in EUTRA. In FIGS. 2 and 3, the horizontal axis represents time and the vertical axis represents frequency.

A radio frame to be identified by a system frame number (SFN) is constituted by 10 milliseconds (10 ms). One subframe is constituted by 1 millisecond (1 ms), and a radio frame includes 10 subframes #F0 to #F9.

As shown in FIG. 2, a PCFICH A11, a PHICH A12, a PDCCH A13, a physical downlink synchronization signal A14, a PBCH A15, a PDSCH/PMCH A16, and a downlink reference signal (RS) A17 are arranged in a radio frame to be used in the downlink.

As shown in FIG. 3, a PRACH A21, a PUCCH A22, a PUSCH A23, a downlink demodulation reference signal A24, and a downlink measurement reference signal A25 are arranged in a radio frame to be used in the uplink.

One subframe (for example, a subframe #F0) is separated into two slots #S0 and #S1. If a normal cyclic prefix (CP) is used, a downlink slot includes 7 orthogonal frequency division multiplex (OFDM) symbols (see FIG. 2), and an uplink slot includes 7 single carrier-frequency division multiple access (SC-FDMA) symbols (see FIG. 3).

If a long CP or an extended CP is used, a downlink slot includes 6 OFDM symbols, and an uplink slot includes 6 SC-FDMA symbols. In EUTRA, physical cell identity (ID) (PCI) information, which is information regarding a basic cell, is acquired by a cell search using a synchronization channel (SCH).

FIG. 4 shows an arrangement of the SCH in EUTRA. The SCH includes a primary SCH (P-SCH) and a secondary SCH (S-SCH). Positions of the P-SCH and S-SCH within a frame in EUTRA will be described.

As shown in FIG. 4, the P-SCH is arranged in last OFDM symbols of first slots of subframe numbers #0 and #5 in 6 resource blocks of the center of a system bandwidth, and slot synchronization is acquired. Next, the S-SCH is arranged on an OFDM symbol immediately before the P-SCH, and is used to acquire frame synchronization. A PCI is specified from a combination of a stream used in the P-SCH and a stream used in the S-SCH. In Non-Patent Document 2, the SCH is referred to as a synchronization signal, but the meaning is identical (Non-Patent Document 2).

In 3GPP, advanced-EUTRA, which performs communication at a higher transmission rate with backward compatibility directed to EUTRA, has been studied. In advanced-EUTRA, a plurality of band component carriers (CCs) through which communication can be performed through EUTRA are arranged in a frequency axis, and the introduction of an aggregation compositely using the band CCs has been studied.

One problem in executing the aggregation is the degradation of carrier metrics by a downlink reference signal. As a method of solving this problem, communication using a different PCI for each component carrier has been proposed (Non-Patent Document 3).

Another problem in executing the aggregation is an introduction method of a component carrier that is not recognized to a mobile station device of EUTRA. To solve this problem, the introduction of a component carrier in which no downlink synchronization signal is arranged as well as a component carrier having a downlink synchronization signal has been proposed (Non-Patent Document 4).

Non-Patent Document 1: GPP TS (Technical Specification) 36.300, V8.4.0 (2008-03), Technical Specification Group Radio Access Network, Evolved Universal Terrestrial Radio Access (E-UTRA) and Evolved Universal Terrestrial Radio Access Network (E-UTRAN); Overall description; Stage 2 (Release 8)

Non-Patent Document 2: 3GPP TS36.211, V8.4.0

Non-Patent Document 3: 3GPP TSG RAN WG1 #55, R1-084195, "Issues on the physical cell ID allocation to the aggregated component carriers," LGE Non-Patent Document 4: 3GPP TSG RAN WG1 Meeting #55, R1-084221, "Non-backward compatible component carriers for asymmetric carrier aggregation," Panasonic

DISCLOSURE OF INVENTION

Problem to be Solved by the Invention

However, there is a problem in that efficiency is low because it is necessary to perform a cell search a plurality of times in order to use a different PCI for each component carrier in a system of the related art. Also, there is a problem in that efficiency is low because it is necessary to arrange a plurality of downlink synchronization signals in order to use a plurality of PCIs.

The present invention has been made in view of the above-described circumstances, and an object of the invention is to provide a base station device, a mobile station device, a communication system, and a communication method, which can efficiently execute an aggregation while suppressing the number of cell searches.

Means for Solving the Problem

The present invention is made to solve the above-described problem. A base station device, according to an aspect of the present invention, which communicates with a mobile station device by configuring at least one cell, the base station device including: a synchronization signal generation unit which generates a synchronization signal corresponding to a cell identity for identifying a cell; and a transmission unit which generates a first transmission signal including the synchronization signal using a first parameter obtained from the cell identity, generates a second transmission signal excluding the synchronization signal using a second parameter obtained from a virtual cell identity different from the cell identity, transmits the first transmission signal using a first frequency band, and transmits the second transmission signal using a second frequency band different from the first frequency band.

In the aspect of the present invention, the transmission unit of the base station device may generate the first transmission signal including information indicating the virtual cell identity.

In the aspect of the present invention, the transmission unit of the base station device may generate the first transmission signal including broadcast information, and the broadcast information may include the information indicating the virtual cell identity.

In the aspect of the present invention, the transmission unit of the base station device may generate the first transmission signal including upper-layer control information, which is control information of an upper layer, and the upper-layer control information may include the information indicating the virtual cell identity.

In the aspect of the present invention, the transmission unit of the base station device may generate the second transmission signal using the second parameter obtained from the virtual cell identity generated by a predetermined generation rule from the cell identity.

In the aspect of the present invention, the transmission unit of the base station device may include: a reference signal generation unit which generates a first reference signal to be transmitted in the first frequency band and a second reference signal to be transmitted in the second frequency band; and a data control unit which generates the first transmission signal by mapping the first reference signal to a position obtained from the cell identity and generates the second transmission signal by mapping the second reference signal to a position obtained from the virtual cell identity.

In the aspect of the present invention, the transmission unit of the base station device may include: a reference signal generation unit which generates a first reference signal using the cell identity and generates a second reference signal using the virtual cell identity; and a data control unit which generates the first transmission signal by mapping the first reference signal and generates the second transmission signal by mapping the second reference signal.

In the aspect of the present invention, the transmission signal generation unit of the base station device may include: a control information generation unit which generates a first control signal scrambled using the cell identity and generates a second control signal scrambled using the virtual cell identity; and a data control unit which generates the first transmission signal by mapping the first control signal and generates the second transmission signal by mapping the second control signal.

A mobile station device, according to another aspect of the present invention, which communicates with a base station device configuring at least one cell, the mobile station device including: a reception unit which receives a first reception signal including a synchronization signal corresponding to a cell identity for identifying a cell using a first parameter obtained from the cell identity via a first frequency band and receives a second reception signal using a second parameter obtained from a virtual cell identity different from the cell identity via a second frequency band.

In the aspect of the present invention, the reception unit of the mobile station device may includes a data extraction unit which extracts information indicating the virtual cell identity from the first reception signal.

In the aspect of the present invention, the reception unit of the mobile station device may include: a data extraction unit which extracts broadcast information from the first reception signal; and a scheduling unit which acquires information indicating the virtual cell identity from the broadcast information.

In the aspect of the present invention, the reception unit of the mobile station device may include: a data extraction unit which extracts upper-layer control information, which is control information of an upper layer, from the first reception signal; and a radio resource control unit which acquires information indicating the virtual cell identity from the upper-layer control information.

In the aspect of the present invention, the reception unit of the mobile station device may receive the second reception signal using the second parameter obtained from the virtual cell identity generated by a predetermined generation rule from the cell identity.

In the aspect of the present invention, the reception unit of the mobile station device may include a channel estimation unit which extracts a first reference signal from the first reception signal based on a position obtained from the cell identity and extracts a second reference signal from the second reception signal based on a position obtained from the virtual cell identity.

In the aspect of the present invention, the reception unit of the mobile station device may include a channel estimation unit which performs channel estimation of the first frequency band using a stream obtained from the cell identity and performs channel estimation of the second frequency band using a stream obtained from the virtual cell identity.

In the aspect of the present invention, the reception unit of the mobile station device may include a data extraction unit which extracts a first control signal by descrambling the first reception signal using the cell identity and extracts a second control signal by descrambling the second reception signal using the virtual cell identity.

In the aspect of the present invention, the mobile station device may include: a mobile station-related reference signal generation unit which generates a third reference signal using the cell identity and generates a fourth reference signal using the virtual cell identity; and a mobile station-transmission unit which transmits a signal including the third reference signal using a third frequency band corresponding to the first frequency band and transmits a signal including the fourth reference signal using a fourth frequency band corresponding to the second frequency band.

A communication system, according to still another aspect of the present invention, which performs communication between a base station device configuring at least one cell and a mobile station device, wherein: the base station device includes: a synchronization signal generation unit which generates a synchronization signal corresponding to a cell identity for identifying a cell; and a transmission unit which generates a first transmission signal including the synchronization signal using a first parameter obtained from the cell identity, generates a second transmission signal excluding the synchronization signal using a second parameter obtained from a virtual cell identity different from the cell identity, transmits the first transmission signal using a first frequency band, and transmits the second transmission signal via a second frequency band different from the first frequency band. The mobile station device includes: a reception unit which receives a first reception signal including the synchronization signal using the first parameter obtained from the cell identity via the first frequency band and receives a second reception signal using the second parameter obtained from the virtual cell identity via the second frequency band.

A communication method, according to still another aspect of the present invention, for use in a communication system which performs communication between a base station device configuring at least one cell and a mobile station device, the communication method including: generating a synchronization signal corresponding to a cell identity for identifying a cell; generating a first transmission signal including the synchronization signal using a first parameter obtained from the cell identity, generating a second transmission signal excluding the synchronization signal using a second parameter obtained from a virtual cell identity different from the cell identity, transmitting the first transmission signal using a first frequency band, and transmitting the second transmission signal via a second frequency band different from the first frequency band; and receiving a first reception signal including the synchronization signal using the first parameter obtained from the cell identity via the first frequency band and receiving a second reception signal using the second parameter obtained from the virtual cell identity via the second frequency band.

A base station device, according to still another aspect of the present invention, which communicates with a mobile station device by configuring at least one cell, the base station device including: a synchronization signal generation unit which generates a synchronization signal corresponding to a cell identity for identifying a cell; and a transmission unit which generates a first transmission signal including the synchronization signal using a first parameter obtained from the cell identity, generates a second transmission signal excluding the synchronization signal using a second parameter different from the first parameter, transmits the first transmission signal using a first frequency band, and transmits the second transmission signal using a second frequency band different from the first frequency band.

A mobile station device, according to still another aspect of the present invention, which communicates with a base station device configuring at least one cell, the mobile station device including: a reception unit which receives a first reception signal including a synchronization signal corresponding to a cell identity for identifying a cell using a first parameter obtained from the cell identity via a first frequency band and receives a signal using a second parameter different from the first parameter via a second frequency band.

Effect of the Invention

A base station device, a mobile station device, a communication system, and a communication method of the present invention can efficiently execute an aggregation while suppressing the number of cell searches.

BEST MODE FOR CARRYING OUT THE INVENTION

A CC (Component Carrier) into which a synchronization signal is inserted and a CC into which no synchronization signal is inserted are introduced into a system in which a mobile station device identifies a cell by referring to the synchronization signal to acquire a PCI (Physical Cell Identity), performs parameter setting unique to the cell, and aggregates and uses a plurality of CCs. Parameter setting corresponding to the PCI acquired by referring to the synchronization signal in the CC (a first frequency band) into which the synchronization signal is inserted is used. In the CC (a second frequency band) into which no synchronization signal is inserted, parameter setting corresponding to a VPCI (virtual PCI) that is a PCI used virtually is used. It is possible to efficiently perform communication because a value different from the PCI can be used as the VPCI. Hereinafter, each embodiment of the present invention will be described with reference to the drawings.

(First Embodiment)

Figure 1:
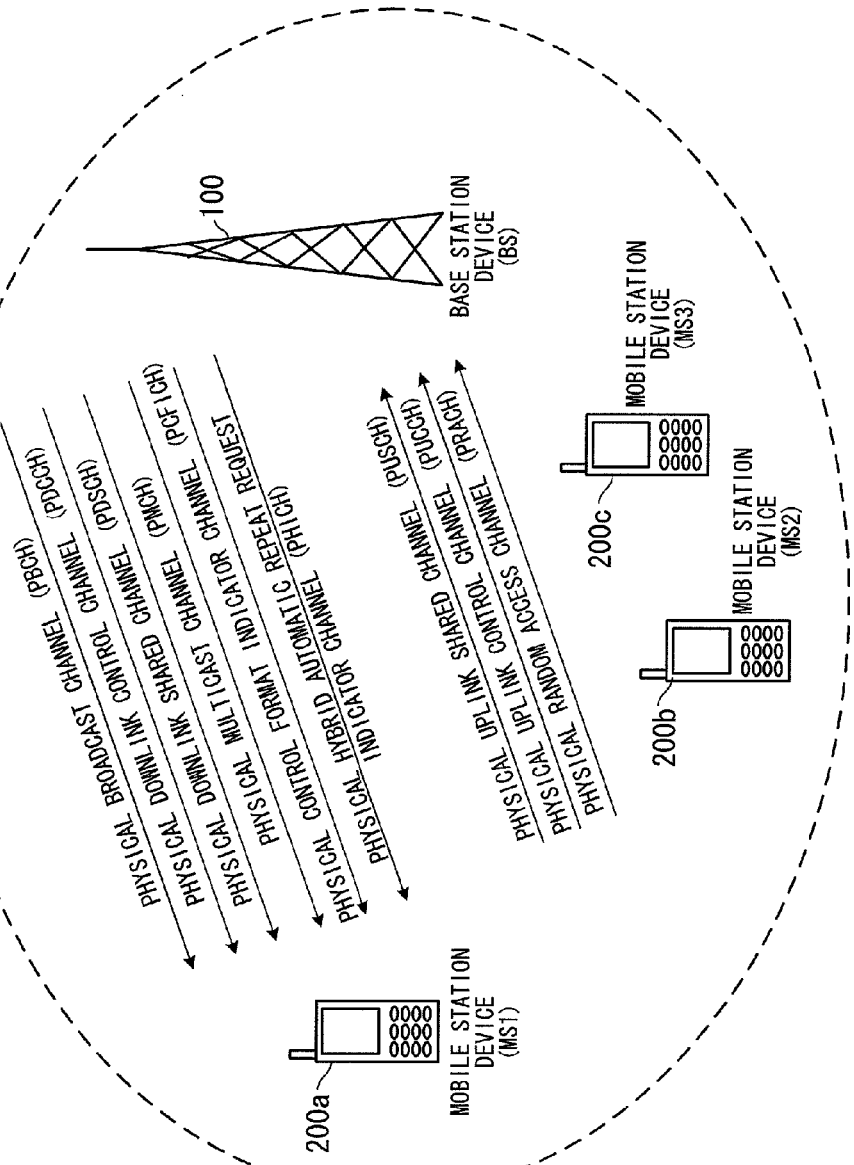
FIG. 1 is a diagram showing a channel configuration according to an embodiment of the present invention.

The first embodiment of the present invention will be described. A wireless communication system according to the embodiment includes one or more base station devices and one or more mobile station devices between which wireless communication is performed. FIG. 1 is a diagram showing the communication system according to the embodiment. The case where an aggregation is performed in the communication system shown in FIG. 1 will be described.

Figure 2:
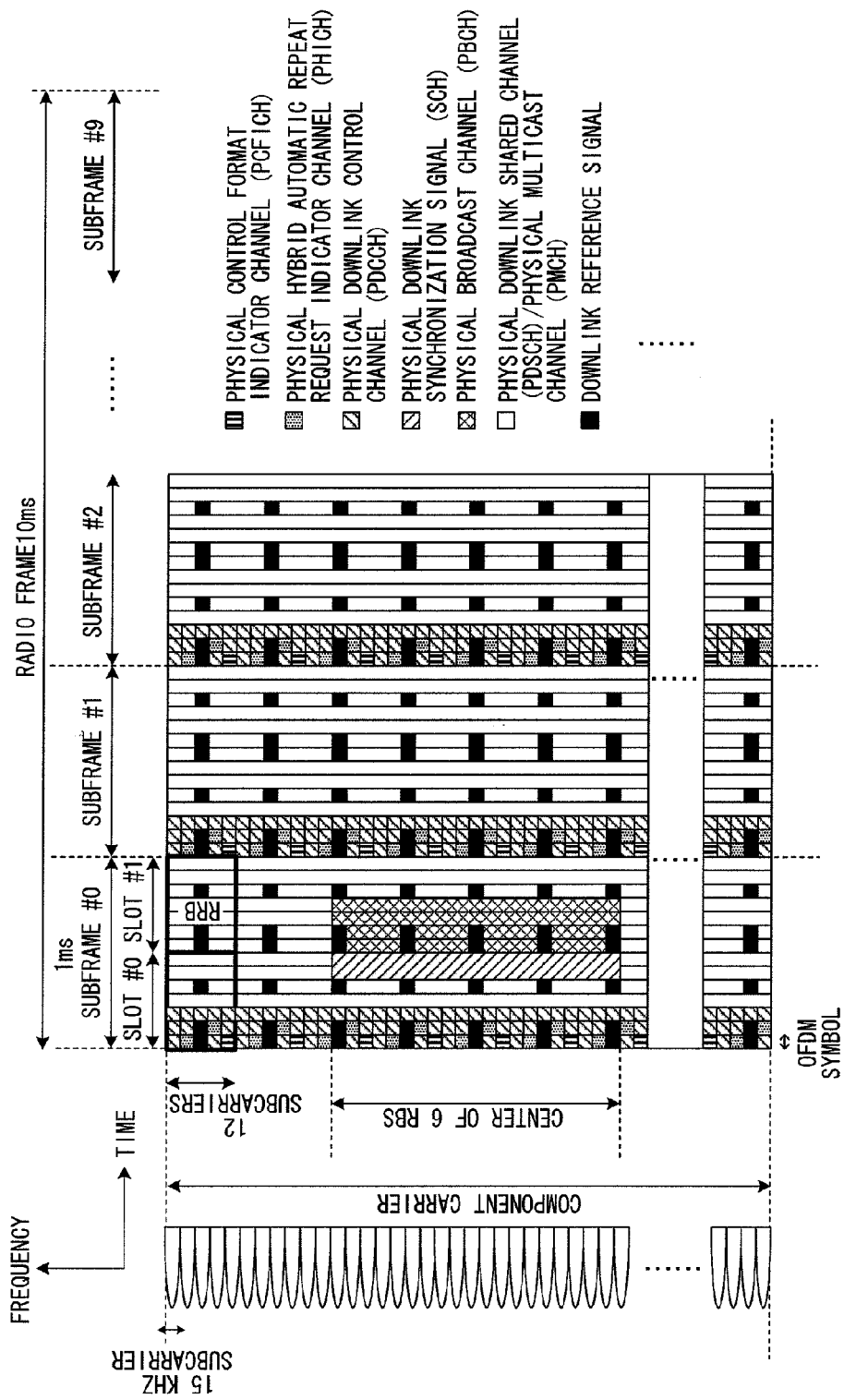
FIG. 2 is a diagram showing a downlink frame configuration used in a communication system according to the embodiment of the present invention.
Figure 3:
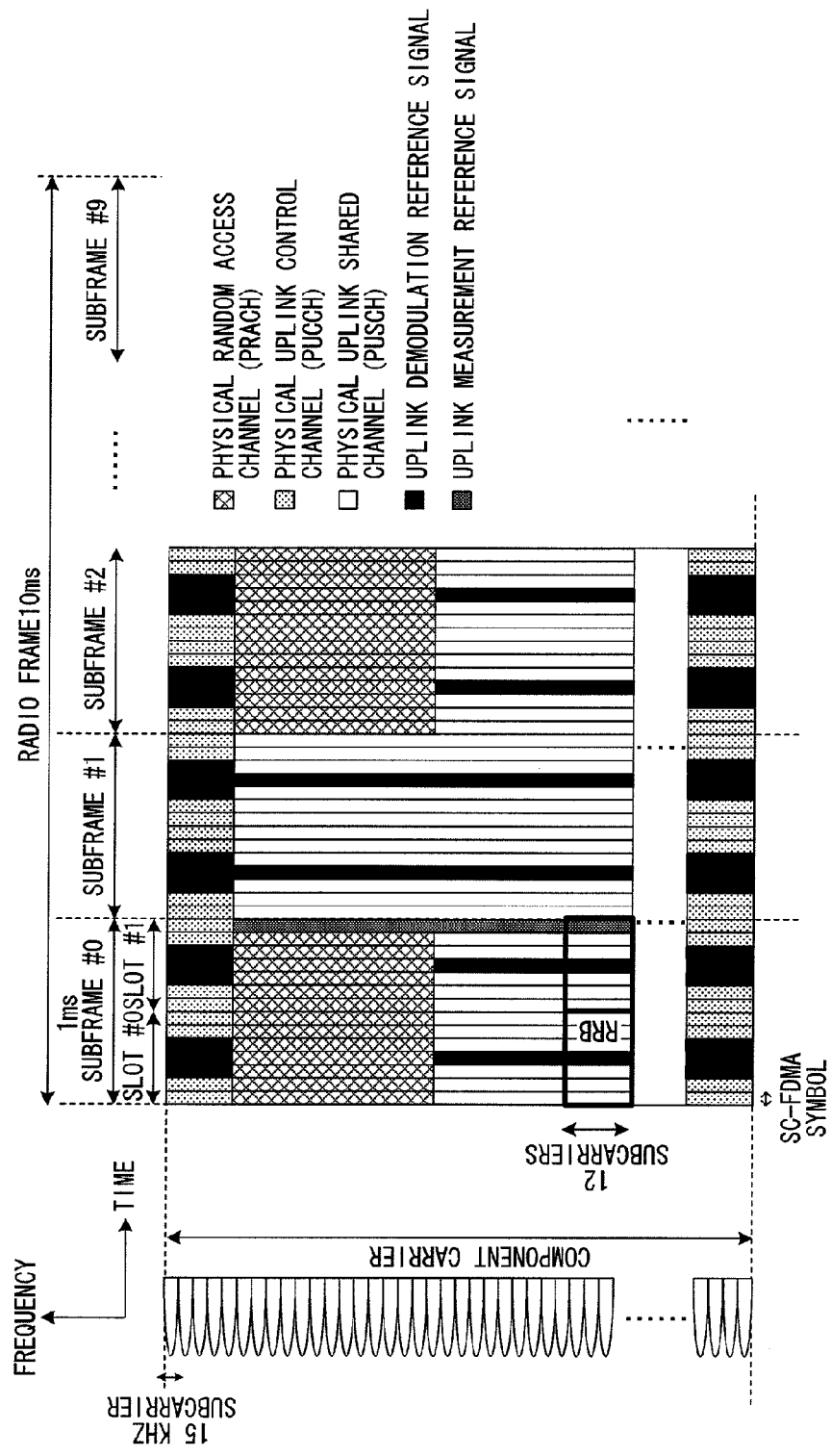
FIG. 3 is a diagram showing an uplink frame configuration used in the communication system according to the embodiment of the present invention.
Figure 4:
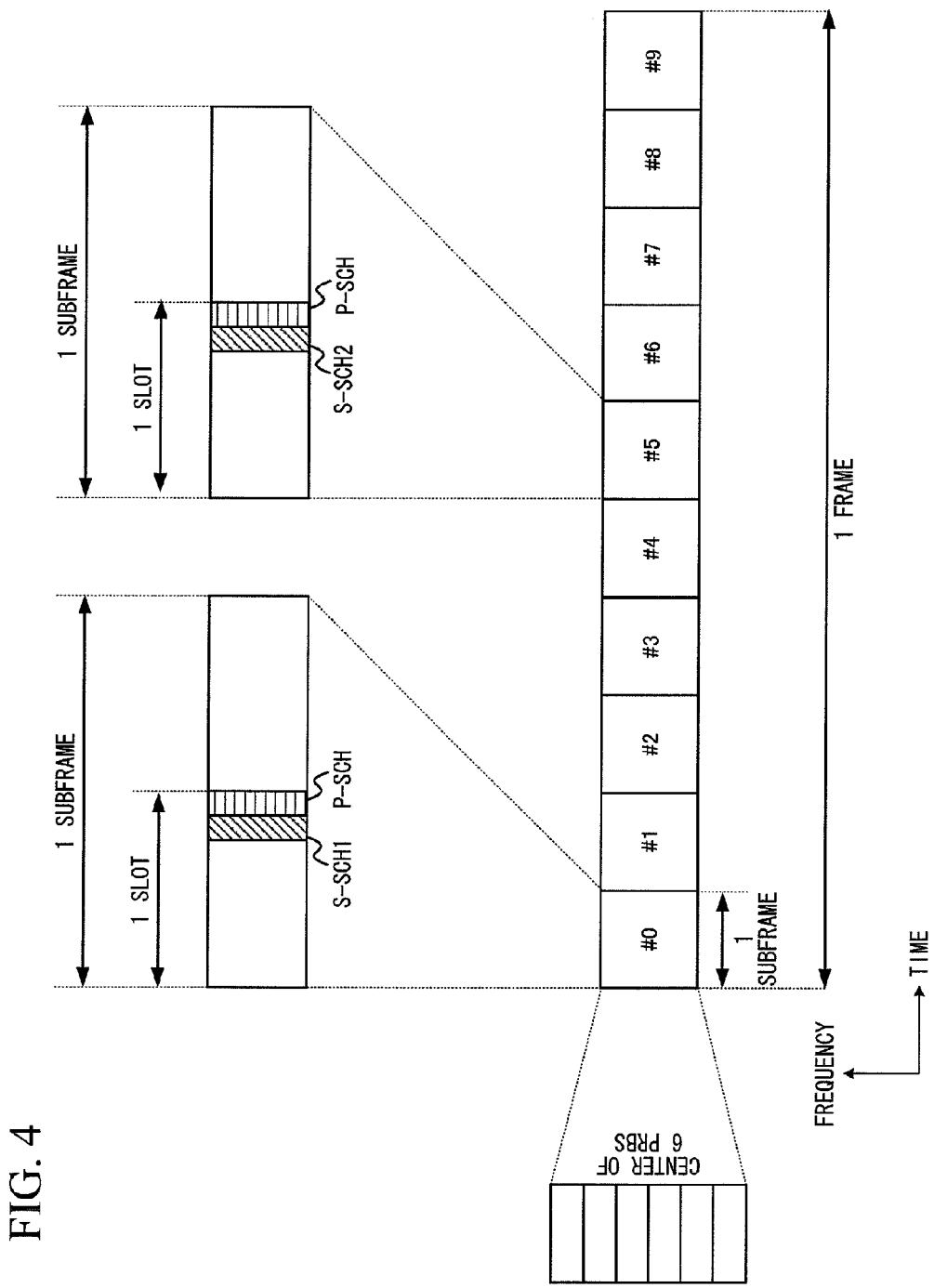
FIG. 4 is a diagram showing a synchronization signal configuration used in a downlink of the communication system according to the embodiment of the present invention.

First, physical channels of one CC identical to those of FIGS. 2 and 3 may be used. FIG. 2 shows physical channels of a downlink. A PBCH is mapped to broadcast information at an interval of 40 ms. The timing of 40 ms is subjected to blind detection or blind decoding. That is, explicit signaling for timing presentation may not be performed. The PBCH can be decoded in its subframe, that is, is self-decodable.

A PDCCH is a channel that is used to notify a mobile station device of PDSCH resource allocation, hybrid ARQ (HARQ) information for downlink data, and uplink transmission permission (uplink grant), which is PUSCH resource allocation.

A PDSCH is a channel that is used to transmit downlink data, paging information, or partial broadcast information. The PMCH is a channel that is used to transmit a multicast channel (MCH). A downlink reference signal, an uplink reference signal, and a physical downlink synchronization signal are separately arranged.

FIG. 3 shows physical channels of an uplink. A PUSCH is a channel that is mainly used to transmit uplink data. When the base station device 100 performs scheduling for the mobile station device 200, a channel feedback report or HARQ response information to downlink transmission is also transmitted using the PUSCH. The channel feedback report is information of a channel quality indicator (CQI), a precoding matrix indicator (PMI), and a rank indicator (RI) of the downlink, and the like. The HARQ response information is information indicating an acknowledgement (ACK) or a negative acknowledgement (NACK).

A PRACH is a channel that is used to transmit a random access preamble and has a guard time. A PUCCH is a channel that is used to transmit a channel feedback report (CQI, PMI, or RI), a scheduling request (SR), HARQ response information (response information) to downlink transmission, or the like.

A PCFICH is a channel that is used to notify the mobile station device of the number of OFDM symbols used for a PDCCH and that is transmitted in each subframe.

A PHICH is a channel that is used to transmit response information to uplink transmission.

Next, channel mapping by the communication system according to the first embodiment of the present invention will be described. As shown in FIG. 2, mapping of the following transport channels and physical channels is performed in the downlink. A broadcast channel (BCH) is mapped to the PBCH.

The MCH is mapped to the PMCH. A paging channel (PCH) and a downlink-shared channel (DL-SCH) are mapped to the PDSCH.

The PDCCH, the PHICH, and the PCFICH are independently used at physical channels.

On the other hand, in the uplink, the following transport channels and physical channels are mapped. An UL-SCH is mapped to the PUSCH.

A random access channel is mapped to the PRACH. The PUCCH is independently used at the physical channel.

Next, a frame configuration used in the wireless communication system according to the first embodiment of the present invention will be described. In processing of a physical layer for a downlink transport channel, assignment of 24-bit cyclic redundancy check (CRC) to the PDSCH, channel coding (transmission channel coding), physical-layer HARQ processing, channel interleaving, scrambling, modulation of quadrature phase shift keying (QPSK), 16 quadrature amplitude modulation (16 QAM), 64 QAM or the like, layer mapping, precoding, resource mapping, antenna mapping, and the like are performed.

On the other hand, in processing of the physical layer for an uplink transport channel, assignment of 24-bit CRC to the PUSCH, channel coding (transmission channel coding), physical-layer HARQ processing, scrambling, modulation (QPSK, 16 QAM, or 64 QAM), resource mapping, antenna mapping, and the like are performed.

The PDCCH, the PHICH, and the PCFICH are arranged in first 3 or fewer OFDM symbols.

In the PDCCH, transport format (prescribing a modulation scheme, a coding scheme, a transport block size, and the like), resource allocation, and HARQ information for the DL-SCH and the PCH are transmitted.

In the PDCCH, transport format (prescribing a modulation scheme, a coding scheme, a transport block size, and the like), resource allocation, and HARQ information for the UL-SCH are transmitted.

A plurality of PDCCHs are supported, and the mobile station device monitors a set of PDCCHs.

The PDSCH allocated by the PDCCH is mapped to the same subframe as that of the PDCCH.

The PUSCH allocated by the PDCCH is mapped to a subframe of a predefined position. For example, if a downlink subframe number of the PDCCH is N, it is mapped to uplink subframe No. N+4.

Hereinafter, the embodiment will be described using a communication system that performs communication using m downlink CCs (Component Carriers) and n uplink CCs.

Figure 5:
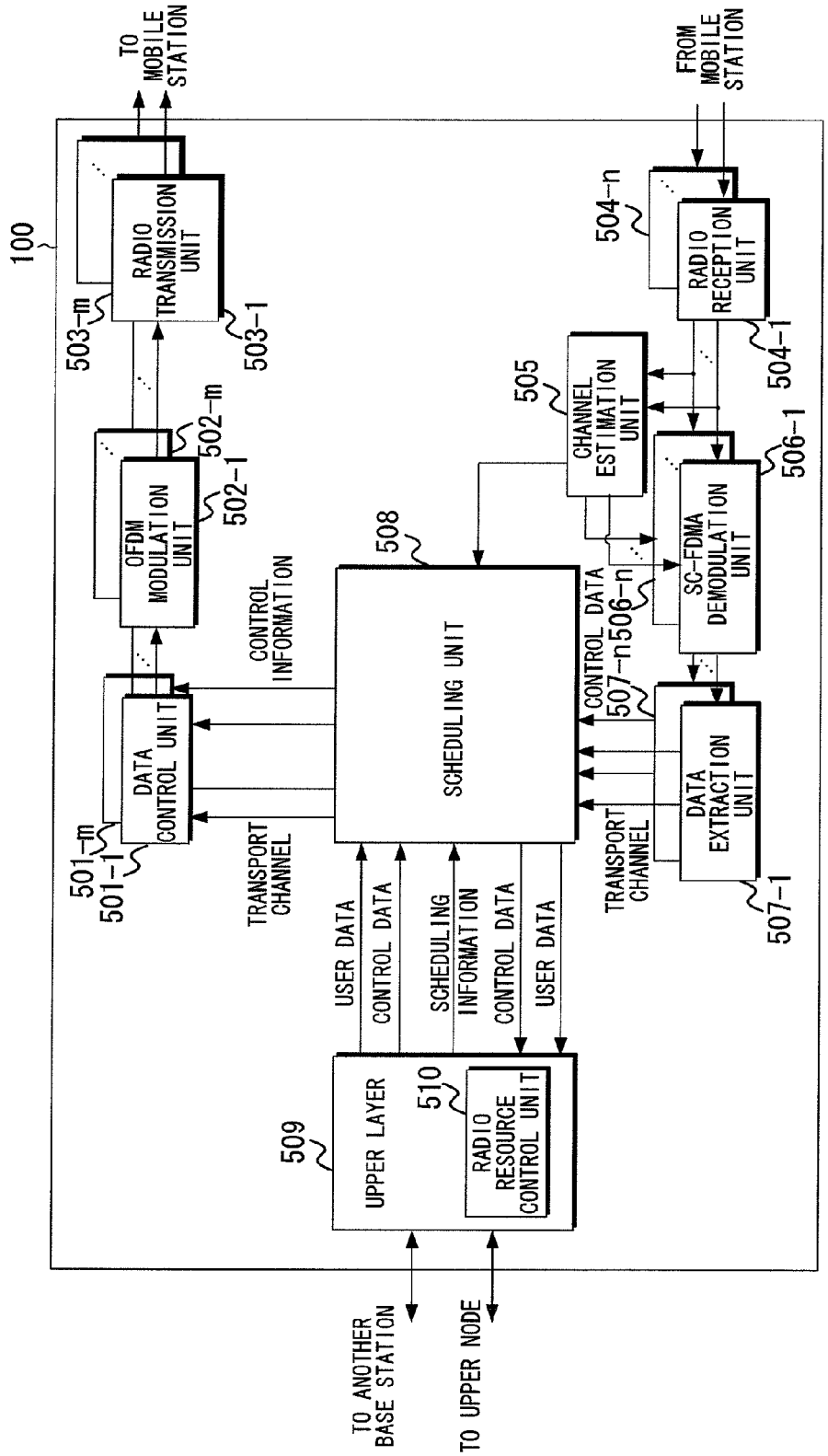
FIG. 5 is a schematic block diagram showing a configuration of a base station device 100 according to the embodiment of the present invention.

FIG. 5 is a schematic block diagram showing a configuration of the base station device 100 according to the embodiment. The base station device 100 includes m data control units 501-1 to 501-$m$ (hereinafter, an arbitrary data control unit is referred to as a data control unit 501), m OFDM modulation units 502-1 to 502-$m$ (hereinafter, an arbitrary OFDM modulation unit is referred to as an OFDM modulation unit 502), m radio transmission units 503-1 to 503-$m$ (hereinafter, an arbitrary radio transmission unit is referred to as a radio transmission unit 503), a scheduling unit 508, n radio reception units (base station-related radio reception units) 504-1 to 504-n (hereinafter, an arbitrary radio reception unit is referred to as a radio reception unit 504), a channel estimation unit (base station-related channel estimation unit) 505, n SC-FDMA (single carrier frequency division multiple access) or DFT-S-OFDM (DFT-spread-OFDM) demodulation units 506-1 to 506-m (hereinafter, an arbitrary SC-FDMA demodulation unit is referred to as an SC-FDMA demodulation unit 506), n data extraction units (base station-related data extraction units) 507-1 to 507-n (hereinafter, an arbitrary data extraction unit is referred to as a data extraction unit 507), and an upper layer 508. In this regard, each block of FIG. 5 is a functional block, and m or n identical blocks may be implemented by one circuit.

The radio reception unit 504, the scheduling unit 508, the channel estimation unit 505, the SC-FDMA demodulation unit 506, the data extraction unit 507, and the upper layer 509 constitute a reception unit. The data control unit 501, the OFDM modulation unit 502, the radio transmission unit 503, the scheduling unit 508, and the upper layer 509 constitute a transmission unit.

The radio transmission unit 503, the channel estimation unit 505, the SC-FDMA demodulation unit 506, and the data extraction unit 507 perform processing of the physical layer of the uplink. The data control unit 501, the OFDM modulation unit 502, and the radio transmission unit 503 perform processing of the physical layer of the downlink.

The data control units 501-1 to 501-m acquire transport channels from the scheduling unit 508. The data control units 501-1 to 501-m map signals and channels generated by the physical layer to physical channels of each CC based on transport channels and control information including scheduling information input from the scheduling unit 508 and the like. Respective data mapped as described above is output to the OFDM modulation units 502-1 to 502-m.

The OFDM modulation units 502-1 to 502-m perform OFDM signal processing such as inverse fast Fourier transform (IFFT) processing, CP insertion, filtering, and the like for data input from the data control units 501-1 to 501-m based on the scheduling information input from the scheduling unit 508 (including downlink PRB allocation information (for example, PRB position information such as frequency and time), a modulation scheme and a coding scheme (for example, 16 QAM modulation and a ⅔ coding rate) corresponding to each downlink PRB, and the like), generate OFDM signals, and output the OFDM signals to the radio units 503-1 to 503-m.

The radio transmission units 503-1 to 503-m generate radio signals by up-converting modulation data input from the OFDM modulation units 502-1 to 502-m into a radio frequency, and transmit the radio signals to the mobile station device 200.

Here, a configuration of generating OFDM signals for each CC and respectively transmitting the OFDM signals from the radio transmission units has been described, but the present invention is not limited thereto. For example, when a plurality of CCs having a narrow frequency interval are used, it is possible to collectively perform OFDM signal processing for outputs of a plurality of data control units 501 and transmit the signals by one radio transmission process.

The radio reception units 504-1 to 504-n receive uplink radio signals from the mobile station device 200, down-convert the radio signals into baseband signals, and output the baseband signals to the channel estimation unit 505 and the SC-FDMA demodulation units 506-1 to 506-n.

The scheduling unit 508 performs processing of a medium access control (MAC) layer. The scheduling unit 508 performs mapping of a logical channel and a transport channel, downlink and uplink scheduling (HARQ processing, transport format selection, and the like), and the like. There are interfaces (not shown) between the scheduling unit 508 and the radio transmission unit 503, the radio reception unit 504, the channel estimation unit 505, the SC-FDMA demodulation unit 506, the data control unit 501, the OFDM modulation unit 502, and the data extraction unit 507 so that the scheduling unit 508 performs integrated control for respective processing units of the physical layer.

In downlink scheduling, the scheduling unit 508 generates scheduling information to be used in processing of selection of a downlink transport format (PRB allocation and modulation schemes, a coding scheme, and the like) for modulating data, retransmission control in the HARQ, and downlink scheduling for each CC, based on feedback information received from the mobile station device 200 (a downlink channel feedback report such as channel quality (CQI), the number of streams (RI), precoding information (PMI), and the like, ACK/NACK feedback information for downlink data, or the like), information of available downlink PRBs of each mobile station device, a buffer state, scheduling information input from the upper layer 509, and the like. The scheduling information that is used in the downlink scheduling is processed to scheduling information for each CC, and control information including the scheduling information for each CC is output to the data control unit 501.

In uplink scheduling, the scheduling unit 508 generates scheduling information to be used for processing of selection of an uplink transport format (PRB allocation and modulation schemes, a coding scheme, and the like) for modulating data and uplink scheduling based on an estimation result of an uplink channel state (radio propagation channel state) output by the channel estimation unit 505, a resource allocation request from the mobile station device 200, information of available PRBs of each mobile station device 200, scheduling information input from the upper layer 509, and the like. The scheduling information that is used in the uplink scheduling is output to the data control unit 501.

The scheduling unit 508 maps logical channels of the downlink input from the upper layer 509 to transport channels, divides the transport channels into each CC, and outputs the transport channels to the data control units 501 corresponding to each CC. The scheduling unit 508 maps control data and a transport channel acquired in the uplink input from the data extraction unit 507 for each CC to a logical channel of the uplink after processing such as coupling, if necessary, and outputs a mapping result to the upper layer 509.

The channel estimation unit 505 estimates an uplink channel state from an uplink demodulation reference signal (DMRS) for uplink data demodulation, and outputs an estimation result to the SC-FDMA demodulation unit 506. Also, in order to perform the uplink scheduling, the uplink channel state is estimated from an uplink sounding reference signal (SRS) and an estimation result is output to the scheduling unit 508.

An uplink communication scheme has been described using a single-carrier scheme such as SC-FDMA, but a multi-carrier scheme such as an OFDM scheme may be used.

The SC-FDMA demodulation units 506-1 to 506-n perform demodulation processing by SC-FDMA signal processing such as a discrete Fourier transform (DFT), subcarrier mapping, an IFFT, and filtering for signals of each CC input from the radio reception units 504-1 to 504-*n*, and output the demodulated signals to the data extraction units 507-1 to 507-*n*.

The data extraction units 507-1 to 507-*n* extract transport channels and control data of the physical layer divided into each CC from data input from the SC-FDMA demodulation units 506-1 to 506-*n*, and output the transport channels and the control data to the scheduling unit 508. The control data includes feedback information reported from the mobile station device 200 (a downlink channel feedback report (CQI, PMI, and RI) and ACK/NACK feedback information for downlink data).

Here, a configuration of processing an SC-FDMA signal of each CC by the SC-FDMA demodulation unit 506 has been described, but the present invention is not limited thereto. For example, in the case of using a plurality of CCs having a narrow frequency interval, it is possible to collectively process SC-FDMA signals of the plurality of CCs by one SC-FDMA demodulation unit and receive the SC-FDMA signals by one radio reception process.

The upper layer 509 performs processing of a packet data convergence protocol (PDCP) layer, a radio link control (RLC) layer, and a radio resource control (RRC) layer. There are interfaces (not shown) between the upper layer 509 and the scheduling unit 508, the radio transmission unit 503, the radio reception unit 504, the channel estimation unit 505, the SC-FDMA demodulation unit 506, the data control unit 501, the OFDM modulation unit 502, and the data extraction unit 507 so that the upper layer 509 performs integrated control for respective processing units of a lower layer.

The upper layer 509 has a radio resource control unit 510. The radio resource control unit 510 performs management of CCs along with management of various setting information, management of system information, paging control, management of a communication state of each mobile station device, mobility management of a handover and the like, management of a buffer state of each mobile station device, management of connection setup of unicast and multicast bearers, management of a mobile station ID (UEID), and the like. The upper layer 509 exchanges information directed to another base station device and information directed to the upper node.

Figure 6:
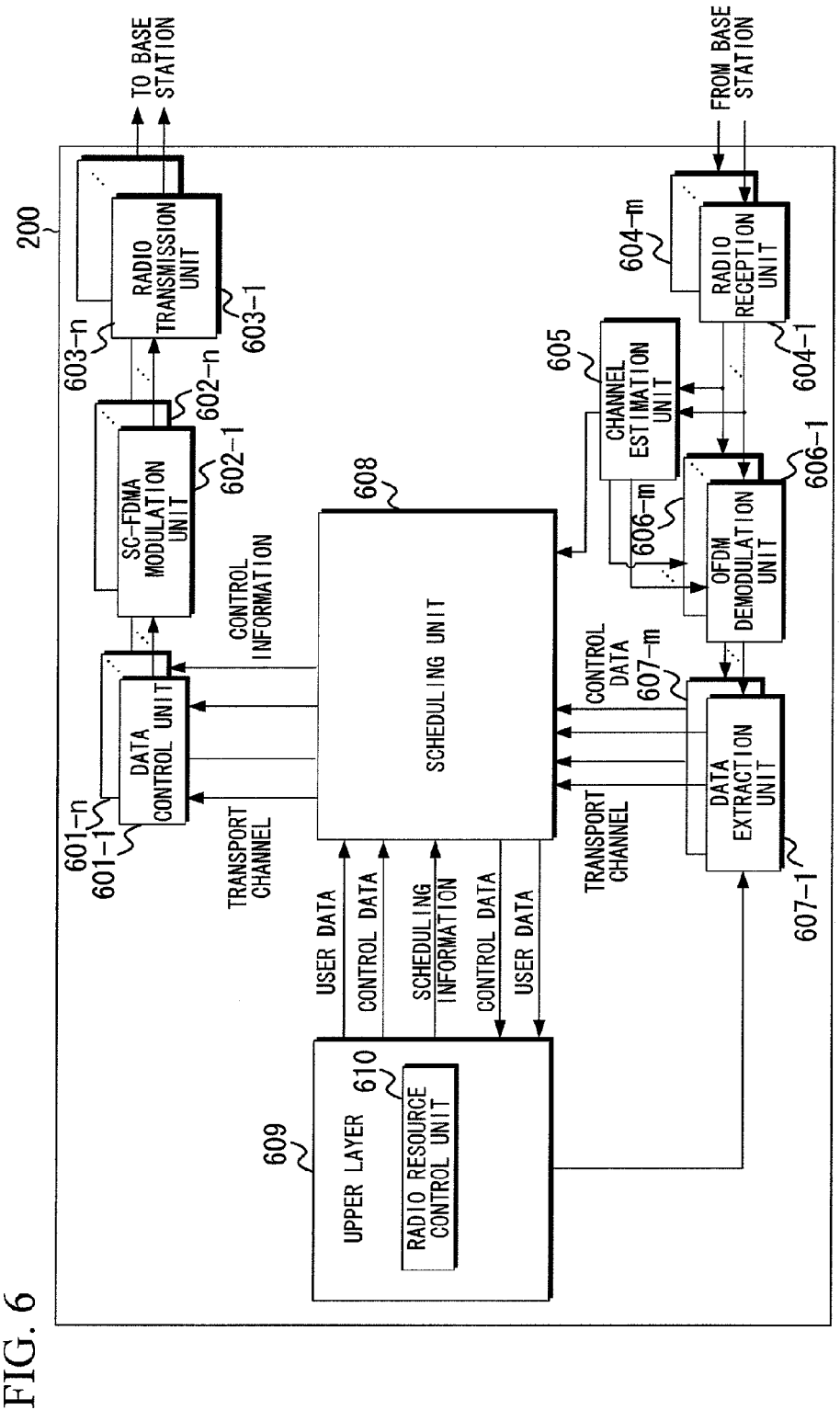
FIG. 6 is a schematic block diagram showing a configuration of a mobile station device 200 according to the embodiment of the present invention.

FIG. 6 is a schematic block diagram showing a configuration of the mobile station device 200 according to the first embodiment of the present invention. The mobile station device 200 includes n data control units (mobile station-related data control units) 601-1 to 601-*n* (hereinafter, an arbitrary data control unit is referred to as a data control unit 601), n SC-FDMA (or DFT-S-OFDM) modulation units 602-1 to 602-*n* (hereinafter, an arbitrary SC-FDMA modulation unit is referred to as an SC-FDMA modulation unit 602), n radio transmission units (mobile station-related radio transmission unit) 603-1 to 603-*n* (hereinafter, an arbitrary radio transmission unit is referred to as a radio transmission unit 603), a scheduling unit (mobile station-related scheduling unit) 608, a channel estimation unit 605, m radio reception units 604-1 to 604-*m* (hereinafter, an arbitrary radio reception unit is referred to as a radio reception unit 604), m OFDM demodulation units 606-1 to 606-*m* (hereinafter, an arbitrary OFDM demodulation unit is referred to as an OFDM demodulation unit 606), m data extraction units 607-1 to 607-*m* (hereinafter, an arbitrary data extraction unit is referred to as a data extraction unit 607), and an upper layer 609. Each block of FIG. 6 shows a functional block, and m or n identical blocks may be implemented by one circuit.

The data control unit 601, the SC-FDMA modulation unit 602, the radio transmission unit 603, the scheduling unit 608, and the upper layer 609 constitute a transmission unit (mobile station-related transmission unit). The radio reception unit 604, the scheduling unit 608, the channel estimation unit 605, the OFDM demodulation unit 606, the data extraction unit 607, and the upper layer 609 constitute a reception unit.

The data control unit 601, the SC-FDMA modulation unit 602, and the radio transmission unit 603 perform processing of the physical layer of the uplink. The radio reception unit 604, the channel estimation unit 605, the OFDM demodulation unit 606, and the data extraction unit 607 perform processing of the physical layer of the downlink.

The data control units 601-1 to 601-*n* acquire transport channels of each CC from the scheduling unit 608. The data control units 601-1 to 601-*n* map signals and channels generated by the physical layer to physical channels of each CC based on the transport channels of each CC and control information including the scheduling information input from the scheduling unit 608. Respective data of each CC mapped as described above is output to the SC-FDMA modulation units 602-1 to 602-*n*.

The SC-FDMA modulation units 602-1 to 602-*n* perform SC-FDMA signal processing such as IFFT processing, CP insertion, filtering, and the like for the data input from the data control units 601-1 to 601-*n*, generate SC-FDMA signals, and output the SC-FDMA signals to the radio transmission units 603-1 to 603-*n*.

An uplink communication scheme is assumed to be a single carrier scheme such as SC-FDMA in each CC, but a multi-carrier scheme such as an OFDM scheme may be used in place thereof.

The radio transmission units 603-1 to 603-*n* up-convert modulation data input from the SC-FDMA modulation units 602-1 to 602-*n* into a radio frequency, generate radio signals, and transmit the radio signals to the base station device 100.

Here, a configuration of generating SC-FDMA signals for each CC and transmitting the SC-FDMA signals from the radio transmission units has been described, but the present invention is not limited thereto. For example, when a plurality of CCs having a narrow frequency interval are used, it is possible to collectively perform SC-FDMA signal processing for outputs of a plurality of data control units 601 and transmit the signals by one radio transmission process.

The radio reception units 604-1 to 604-*m* receive radio signals modulated by downlink data from the base station device 100, down-convert the received radio signals into baseband signals, and output reception data to the channel estimation unit 605 and the OFDM demodulation units 606-1 to 606-*m*.

The scheduling unit 608 performs processing of a MAC layer. The scheduling unit 608 performs mapping of the logical channel and the transport channel, downlink and uplink scheduling (HARQ processing, transport format selection, and the like), and the like. There are interfaces (not shown) between the scheduling unit 608 and the data control unit 601, the SC-FDMA modulation unit 602, the channel estimation unit 605, the OFDM demodulation unit 606, the data extraction unit 607, the radio transmission unit 603, and the radio reception unit 604 so that the scheduling unit 608 performs integrated control for respective processing units of the physical layer.

In uplink scheduling, the scheduling unit 608 generates scheduling information to be used in scheduling processing for mapping logical channels of the uplink from the upper layer 609 to transport channels and uplink scheduling based on an uplink buffer state input from the upper layer 609, uplink scheduling information of each CC from the base station device 100 input from the data extraction unit 607

(transport format, HARQ retransmission information, and the like), scheduling information input from the upper layer 609, and the like.

The scheduling unit 608 also maps the logical channels of the uplink input from the upper layer 609 to the transport channels, divides the transport channels into each CC, and outputs the transport channels to the data control units 601 corresponding to each CC. The scheduling unit 608 also outputs a downlink channel feedback report (CQI, PMI, and RI) input from the channel estimation unit 605 to the data control unit 601.

The scheduling unit 608 maps control data and a transport channel acquired in the downlink input from the data extraction unit 607 for each CC to a logical channel of the downlink after processing such as coupling, if necessary, and outputs a mapping result to the upper layer 609.

To demodulate the downlink data, the channel estimation unit 505 estimates a downlink channel state from a downlink reference signal, and outputs its estimation result to the OFDM demodulation unit 606.

In order to report an estimation result of a downlink channel state (radio propagation channel state) to the base station device 100, the channel estimation unit 605 estimates the downlink channel state from the downlink reference signal, converts the estimation result into a downlink channel feedback report (channel quality information and the like), and outputs the downlink channel feedback report to the scheduling unit 608.

The OFDM demodulation units 606-1 to 606-$m$ perform OFDM demodulation processing for modulation data input from the radio reception units 604-1 to 604-$m$ based on the downlink channel state estimation result input from the channel estimation unit 605, and outputs the demodulated data to the data extraction units 607-1 to 607-$m$.

The data extraction units 607-1 to 607-$m$ separate transport channels and control data of the physical layer of each CC from the data input from the OFDM demodulation units 606-1 to 606-$m$, and output the transport channels and the control data to the scheduling unit 608. The separated control data includes scheduling information such as downlink or uplink resource allocation or uplink HARQ control information. At this time, a search space (referred to as a search region) of the PDCCH is decoded and the downlink or uplink resource allocation addressed to its own station is extracted.

The upper layer 609 performs processing of a PDCP (packet data convergence protocol) layer, an RLC (radio link control) layer, and an RRC (radio resource control) layer. The upper layer 609 has a radio resource control unit 610. There are interfaces (not shown) between the upper layer 609 and the scheduling unit 608, the data control unit 601, the SC-FDMA modulation unit 602, the channel estimation unit 605, the OFDM demodulation unit 606, the data extraction unit 607, the radio transmission unit 603, and the radio reception unit 604 so that the upper layer 609 performs integrated control for processing units of a lower layer.

The radio resource control unit 610 performs management of CCs along with management of various setting information, management of system information, paging control, management of a communication state of its own station, mobility management of a handover and the like, management of a buffer state, management of connection setup of unicast and multicast bearers, and management of a mobile station ID (UEID).

Figure 7:
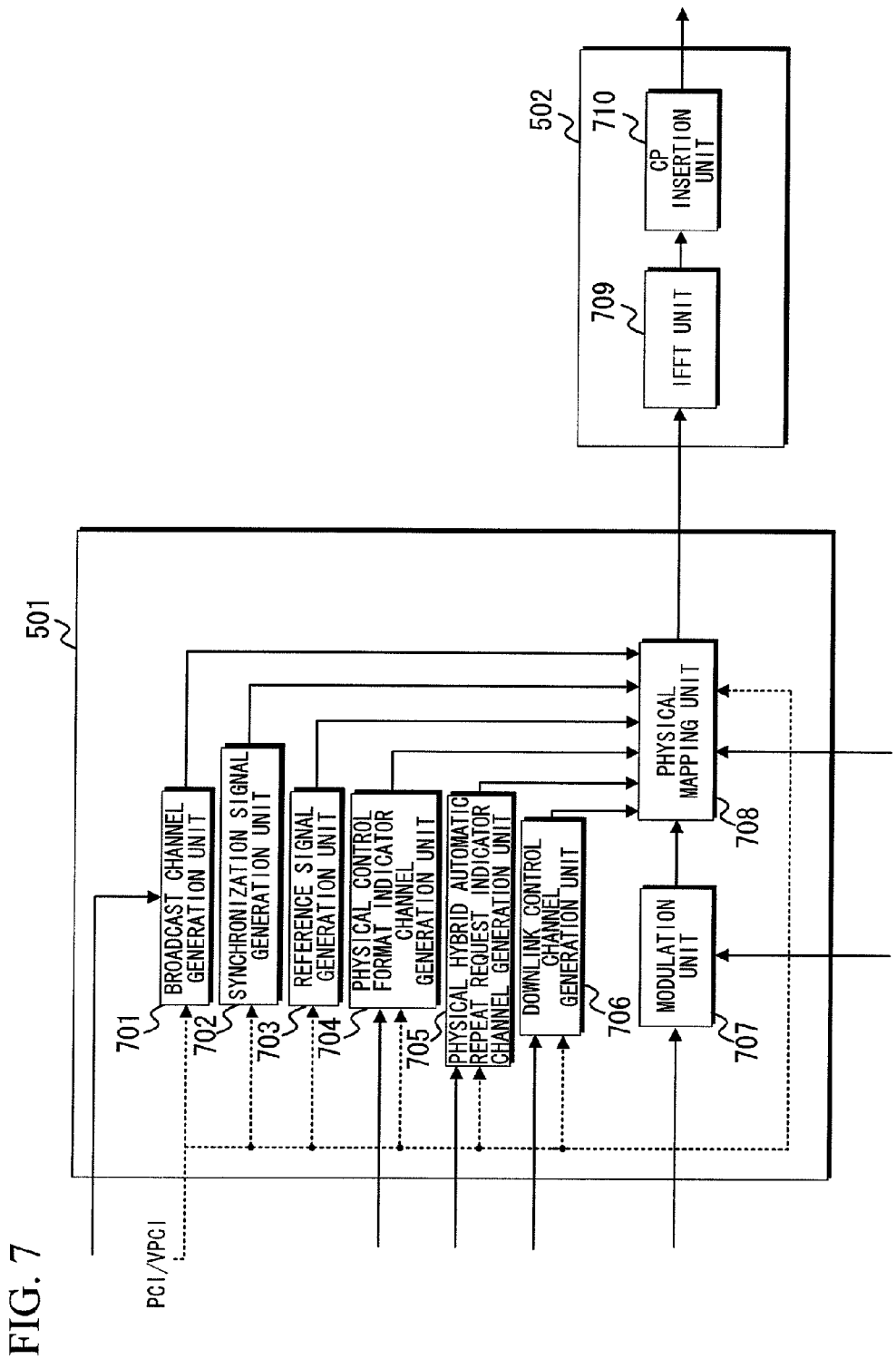
FIG. 7 is a schematic block diagram showing configurations of a data control unit 501 and an OFDM modulation unit 502 of the base station device 100 according to the embodiment of the present invention.

Next, a series of processing in the downlink will be described. FIG. 7 is a schematic block diagram showing an example of configurations of the data control unit 501 and the OFDM modulation unit 502 related to the transmission unit of the base station device 100 (FIG. 5) according to the first embodiment of the present invention.

The data control unit 501 includes a physical mapping unit 708, a broadcast channel generation unit 701, a synchronization signal generation unit 702, a reference signal generation unit 703, a physical control format indicator channel generation unit 704, a physical hybrid automatic repeat request indicator channel generation unit 705, a downlink control channel generation unit 706, and a modulation unit 707. A PCI (or VPCI) is set for each CC (each data control unit).

The broadcast channel generation unit 701 generates a modulation symbol stream from a transport block mapped to the BCH, generates a PBCH or a dynamic BCH by scrambling the generated stream based on the PCI (or VPCI), and outputs the PBCH or the dynamic BCH to the physical mapping unit 708. The PBCH or the dynamic BCH may not be generated in the data control unit 501 corresponding to a CC (an extended CC, a sub-CC, or an LTE-A only CC) into which no synchronization signal is inserted.

In the data control unit 501 corresponding to a CC (a synchronization CC, an anchor CC, or a first frequency band) into which a synchronization signal is inserted, the synchronization signal generation unit 702 generates synchronization signals (a primary synchronization signal and a secondary synchronization signal) by referring to the PCI, and outputs the synchronization signals to the physical mapping unit 708. In the data control unit 501 corresponding to a CC (an extended CC, a sub-CC, or a second frequency band) into which no synchronization signal is inserted, the synchronization signal generation unit 702 generates no synchronization signal. Alternatively, the data control unit 501 corresponding to a CC into which no synchronization signal is inserted does not have the synchronization signal generation unit 702.

The reference signal generation unit 703 generates a downlink reference signal, which is a stream based on the PCI (or VPCI), and outputs the downlink reference signal to the physical mapping unit 708.

The physical control format indicator channel generation unit 704 acquires the number of OFDM symbols required for a downlink control channel from scheduling information, generates a PCFICH by scrambling a stream corresponding to the acquired number of OFDM symbols based on the PCI (or VPCI), and outputs the PCFICH to the physical mapping unit 708.

The physical hybrid automatic repeat request indicator channel generation unit 705 acquires response information (ACK/NACK) corresponding to uplink data (a transport block) from the scheduling information, generates a PCFICH by scrambling a stream corresponding to the acquired response information based on the PCI (or VPCI), and outputs the PHICH to the physical mapping unit 708.

The downlink control channel generation unit generates a modulation symbol stream from control information, generates a downlink control channel by scrambling based on the PCI (or VPCI), and outputs the downlink control channel to the physical mapping unit 708.

The modulation unit 707 generates a modulation symbol stream based on a modulation scheme such as QPSK modulation, 16 QAM modulation, or 64 QAM modulation from a transport block, and outputs the modulation symbol stream to the physical mapping unit 708.

The physical mapping unit 708 maps a transport channel processed by the modulation unit 707 to each PRB based on the scheduling information and the PCI (or VPCI), and multiplexes a BCH, a synchronization signal, a downlink reference signal, a physical control format channel, a physical hybrid automatic repeat request channel, and a downlink control channel into a physical frame.

It is possible to obtain the effect of improving communication quality, reducing a load of a transmission/reception circuit, or the like by setting a PCI (or VPCI) for each CC (each data control unit), and, for example, obtain the following effects.

Because scrambling is performed using a different scrambling stream for each CC, it is possible to prevent a situation in which inter-cell interference increases in all CCs and obtain the diversity effect between the CCs.

Because control information and/or data is transmitted using a different resource element for each CC, it is possible to prevent a situation in which inter-cell interference increases in all CCs and obtain the diversity effect between the CCs.

Because a reference signal is transmitted using a different resource element for each CC, it is possible to prevent a situation in which inter-cell interference increases in all CCs and improve demodulation quality at a receiver.

Because a reference signal is transmitted using a different resource element for each CC, a reference signal arrangement is aperiodic in all bands. Because peak power of a transmission signal can be suppressed, a load of a transmission/reception device can be reduced and cost can be suppressed.

Even when a PCI is comparatively freely selected in a plurality of adjacent cells, it is possible to decrease a probability of using the same parameter in all CCs and suppress interference.

Here, the case where a PCI is set and processing corresponding to the PCI in which each block is set is performed has been described, but the present invention is not limited thereto. For example, instead of setting the PCI, a stream corresponding to the above-described PCI or the like may be preset and used within each block.

It is possible to obtain the effect of improving communication quality or reducing transmission/reception processing by providing a CC into which no synchronization signal is inserted. For example, it is possible to obtain the following effect. At a receiver, the number of times of synchronization processing (cell search processing) can be reduced.

Because only a mobile station device capable of acquiring a virtual PCI can perform communication via a CC into which no synchronization signal is inserted, a bandwidth for use in communication by a category of the mobile station device is variable and an efficient system operation is possible. A different service is performed in accordance with the category of the mobile station device for each CC.

An overhead of the synchronization signal can be reduced and a resource of a synchronization signal can be used for other purposes.

At a transmitter, a load of synchronization signal generation processing can be reduced.

Because it is possible to increase a ratio at which a mobile station is connected to a CC into which a synchronization signal is inserted, it is possible to efficiently perform information transmission (broadcasting or the like) in the CC into which the synchronization signal is inserted.

The OFDM modulation unit 502 includes an IFFT unit 709 and a CP insertion unit 710. The IFFT unit 709 transforms a frequency domain signal into a time domain signal by performing an IFFT for a modulation symbol on a physical frame of each CC mapped in the physical mapping unit 708 (a modulation symbol arranged on a plane of a frequency axis and a time axis), and outputs the time domain signal to the CP insertion unit 710.

The CP insertion unit 710 inserts a CP into the time domain signal, generates an OFDM symbol (a first transmission signal in the synchronization CC or a second transmission signal in the extended CC), and outputs the OFDM symbol to the radio transmission unit 503.

On the other hand, the radio reception unit 604 of the mobile station device 200 acquires subframe synchronization by referring to a synchronization signal pre-inserted into a signal by cell selection and cell reselection processing. In this case, a primary synchronization signal is detected and a secondary synchronization signal is further detected in the OFDM demodulation unit. A detection result of the primary synchronization signal and the secondary synchronization signal is transmitted to the scheduling unit 608 or the upper layer 609, and a PCI corresponding to the synchronization signals is selected and set as a PCI in the synchronization CC within the mobile station. In a CC other than the synchronization CC, a VPCI is also set for each CC (each data extraction unit).

The channel estimation unit 605 extracts a downlink reference signal from a physical frame (a first reception signal in the synchronization CC or a second reception signal in the extended CC) based on the set PCI (or VPCI). Further, channel estimation is performed by referring to a stream based on the set PCI (or VPCI).

The data extraction unit 607 refers to the set PCI (or VPCI), and extracts transport blocks from the BCH and the DL-SCH. The data extraction unit 607 also refers to the set PCI (or VPCI), and extracts control data from the PCFICH, the downlink control channel, and the PHICH.

Figure 8:
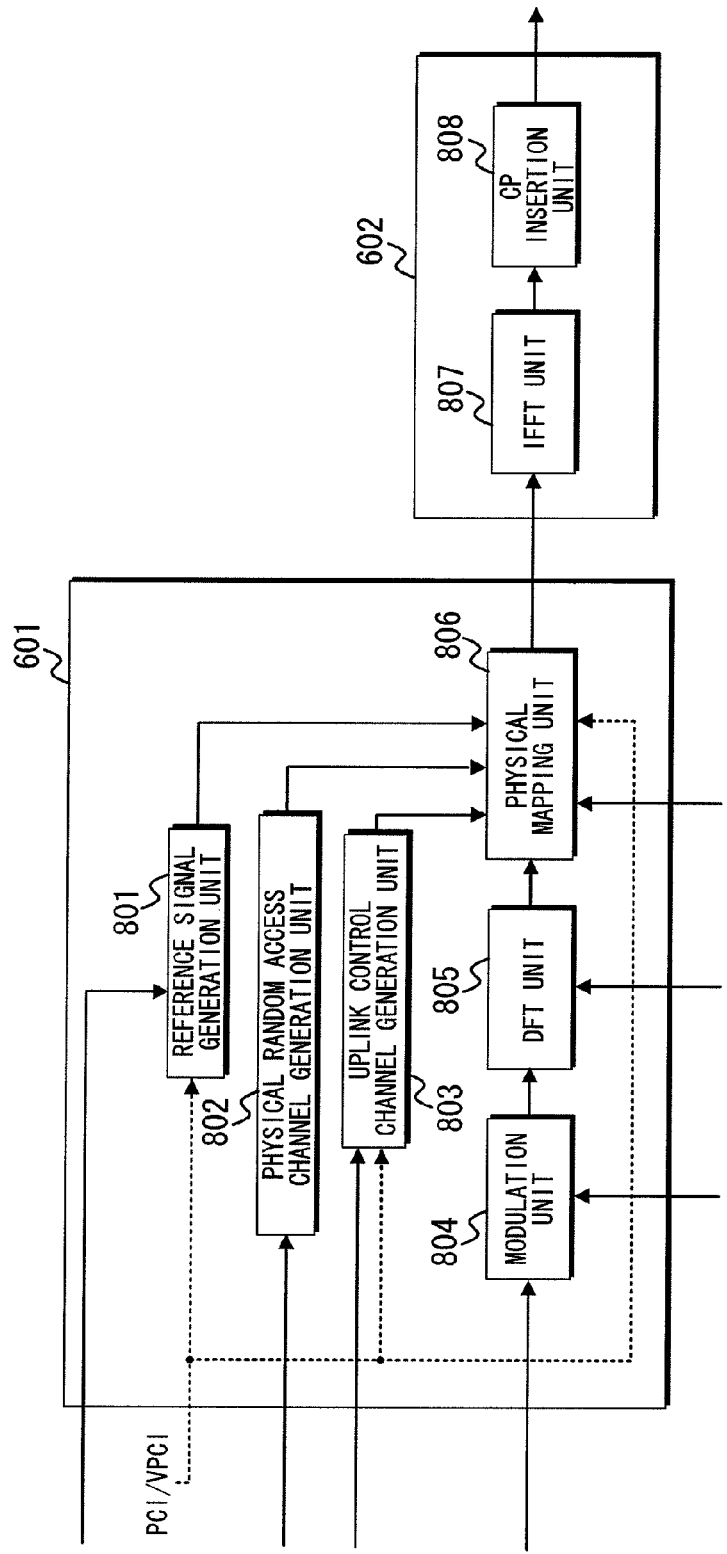
FIG. 8 is a schematic block diagram showing configurations of a data control unit 601 and an SC-FDMA modulation unit 602 of the mobile station device 200 according to the embodiment of the present invention.

Next, a series of processing in the uplink will be described. FIG. 8 is a schematic block diagram showing an example of configurations of the data control unit 601 and the SC-FDMA modulation unit 602 related to the transmission unit of the mobile station device 200 (FIG. 6) according to the first embodiment of the present invention.

The data control unit 601 includes a reference signal generation unit (mobile station-related reference signal generation unit) 801, a physical random access channel generation unit 802, an uplink control channel generation unit 803, a modulation unit 804, and a DFT unit 805.

The reference signal generation unit 801 generates a downlink reference signal, which is a stream based on a PCI (or VPCI) set within the mobile station device, and outputs the downlink reference signal to the physical mapping unit 806.

The physical random access channel generation unit 802 generates a predetermined stream from control information, and outputs the predetermined stream to the physical mapping unit 806.

The uplink control channel generation unit generates a modulation symbol stream from control information, generates an uplink control channel using the stream based on the PCI (or VPCI) set within the mobile station device, and outputs the uplink control channel to the physical mapping unit 806.

The modulation unit 804 generates a modulation symbol stream based on a modulation scheme such as QPSK modulation, 16 QAM, or 64 QAM from a transport block based on scheduling information, and outputs the modulation symbol stream to the DFT unit 805.

The DFT unit 805 performs DFT processing for the modulation symbol stream output from the modulation unit 804 based on the scheduling information, and outputs a DFT processing result to the physical mapping unit 806.

The physical mapping unit 806 maps a transport channel processed by the DFT unit 805 to each PRB based on the scheduling information and the PCI set within the mobile station device. In this case, the physical mapping unit 806 may multiplex an uplink reference signal, a PRACH, and an uplink control channel into a physical frame.

The SC-FDMA modulation unit 602 includes an IFFT unit 807 and a CP insertion unit 808. The IFFT unit 807 transforms a frequency domain signal into a time domain signal by performing an IFFT for a signal on a physical frame of each CC mapped in the physical mapping unit 806 (a signal arranged on a plane of a frequency axis and a time axis), and outputs the time domain signal to the CP insertion unit 808.

The CP insertion unit 808 inserts a CP into the time domain signal, generates an SC-FDMA symbol, and outputs the SC-FDMA symbol to the radio transmission unit 603.

On the other hand, the channel estimation unit 505 of the base station device 100 extracts a downlink reference signal from a physical frame, and performs channel estimation by referring to a stream based on a PCI (or VPCI) set within the base station device 100.

The data extraction unit 507 refers the set PCI (or VPCI), and extracts control data or a transport block from an uplink control channel and a UL-SCH.

Figure 9:
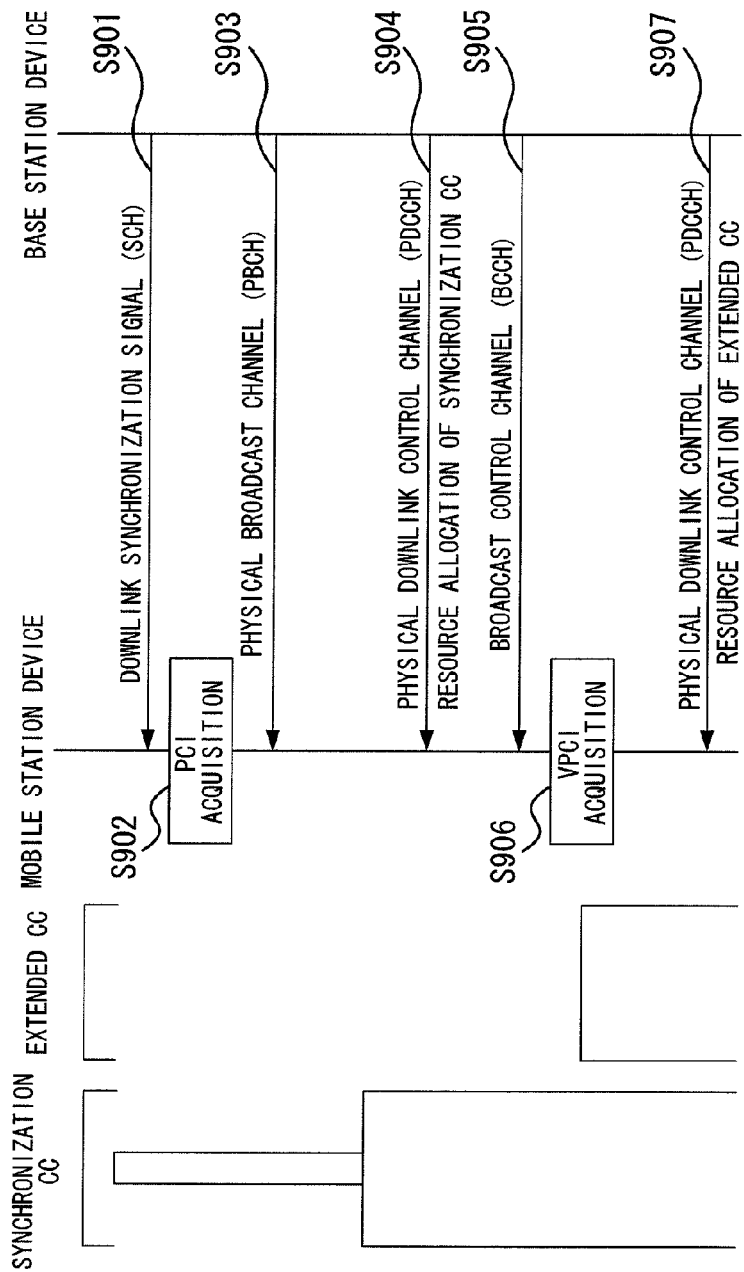
FIG. 9 is a sequence diagram showing an example of processing of a wireless communication system according to the embodiment of the present invention.

Next, a sequence of PCI (or VPCI) setting of each CC according to the embodiment will be described. FIG. 9 is a sequence diagram showing an example of processing of the wireless communication system according to the embodiment. First, the base station device 100 transmits a downlink synchronization signal corresponding to a PCI in a synchronization CC (step S901).

The mobile station device 200 acquires the downlink synchronization signal transmitted from the base station device 100 by cell selection or cell re-selection processing, and acquires the PCI of the synchronization CC by performing downlink synchronization processing (step S902). In this case, synchronization processing is performed for a CC (synchronization CC) into which a downlink synchronization signal is inserted without detecting a CC (extended CC) into which no downlink synchronization signal is inserted.

The mobile station device 200 acquires a PBCH so that processing is performed in the synchronization CC (or so that manipulation is performed in the synchronization CC) (step S903). In this case, information regarding the synchronization CC, that is, information indicating a system bandwidth of the synchronization CC (the number of resource blocks) or the like, is acquired from the PBCH. Further, the processing is continuously performed so that the manipulation is performed in the synchronization CC (step S904).

The mobile station device 200 receives the BCCH in the synchronization CC (step S905). Here, the BCCH is generated by the upper layer 509 of the base station device 100, mapped to a DL-SCH, which is one of transport channels, and transmitted to the mobile station device 200 via a PDSCH of the physical layer. The mobile station device 200 extracts the DL-SCH by the data extraction unit 607, and transmits the DL-SCH to the upper layer 609 as the BCCH from the scheduling unit 608.

In this broadcast information channel, a virtual PCI of each extended CC may be included along with information regarding an aggregation resource region, that is, information indicating a carrier frequency or a system bandwidth (the number of resource blocks) of the extended CC, or the like. The mobile station device 200 acquires the virtual PCI by the broadcast information channel (step S906). Thereby, at least information indicating the VPCI referred to by the data control unit 501 corresponding to the extended CC is reported from the upper layer 509 of the base station device 100 to the upper layer 609 of the mobile station device 200.

Setting of the carrier frequency or the system bandwidth in the extended CC and noinial communication in the extended CC after the VPCI is set as the PCI in processing of the extended CC within the mobile station device in the scheduling unit 608 are performed (step S907).

The case where the virtual PCI is broadcast by the broadcast information channel in the sequence shown in FIG. 9 has been described, but the present invention is not limited thereto. The VPCI is uniquely determined by information reported on the broadcast information channel and the PCI (and/or other broadcast information or control information), so that the same effect can be obtained. For example, the same effect can be obtained even when a method of calculating a VPCI from a CC identity (CCID) and a PCI is predefined and implicitly shared between the base station device and the mobile station device. A method of generating a table of a VPCI corresponding to a CCID and a PCI and referring to the table or a calculation method by a numerical expression VPCI (k)=mod((PCI+CCID), (MPCI+1)) may be used as a VPCI calculation method. Here, mod is a modulo function (remainder function) and MPCI is a maximum value capable of being taken by a PCI.

Figure 10:
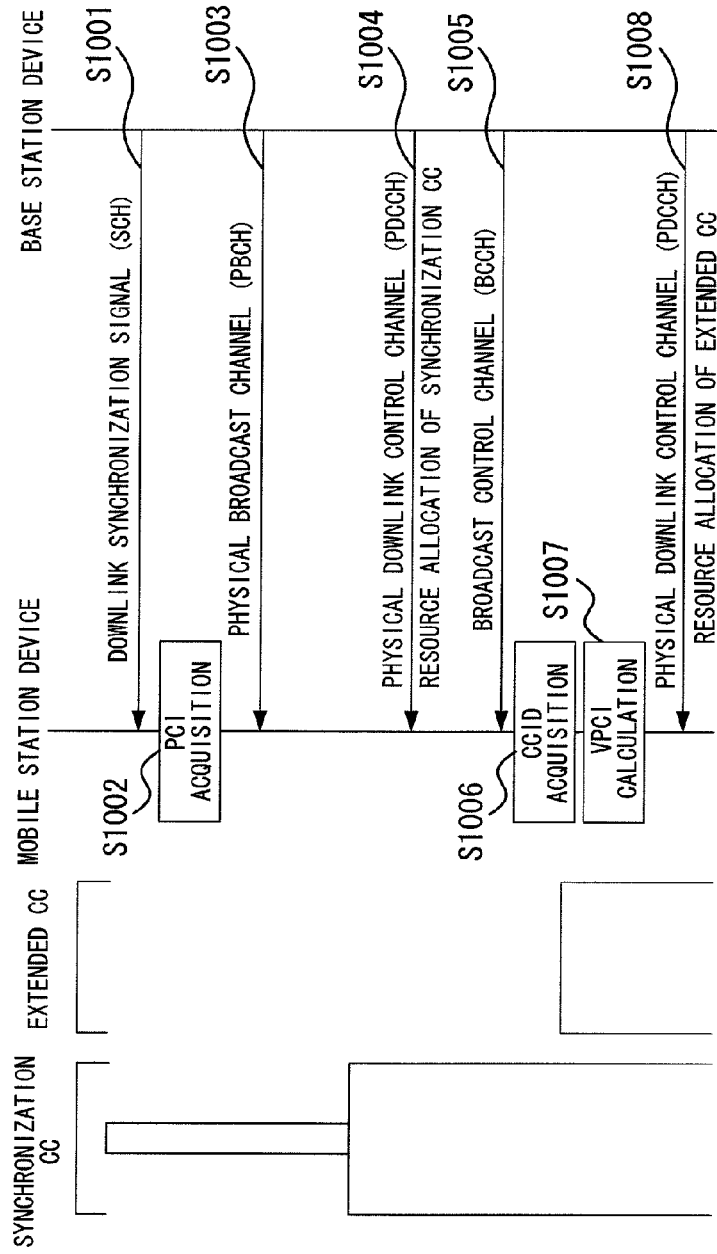
FIG. 10 is a sequence diagram showing another example of the processing of the wireless communication system according to the embodiment of the present invention.

FIG. 10 is a sequence diagram showing another example of processing of the wireless communication system according to the embodiment. First, the base station device 100 transmits a downlink synchronization signal corresponding to a PCI in a synchronization CC (step S1001).

The mobile station device 200 acquires the downlink synchronization signal transmitted from the base station device 100 by cell selection or cell re-selection processing, and acquires the PCI of the synchronization CC by performing downlink synchronization processing (step S1002). In this case, synchronization processing is performed for a CC (synchronization CC) into which a downlink synchronization signal is inserted without detecting a CC (extended CC) into which no downlink synchronization signal is inserted.

The mobile station device 200 acquires a PBCH so that processing is performed in the synchronization CC (or so that manipulation is performed in the synchronization CC) (step S1003). In this case, information regarding the synchronization CC, that is, information indicating a system bandwidth of the synchronization CC (the number of resource blocks) or the like, is acquired from the PBCH. Further, the processing is continuously performed so that the manipulation is performed in the synchronization CC (step S1004).

The mobile station device 200 receives a BCCH in the synchronization CC (step S905). This broadcast information channel may include information regarding an aggregation resource region, that is, information indicating a CCID, a carrier frequency, or a system bandwidth (the number of resource blocks) of the extended CC, or the like. The mobile station device 200 acquires the CCID by the broadcast information channel (step S1006). The mobile station device 200 acquires a VPCI of the extended CC from a PCI of the synchronization CC and the CCID of each CC (step S1007). Thereby, at least information indicating the VPCI referred to by the data control unit 501 corresponding to the extended CC is shared between the base station device 100 and the mobile station device 200.

Setting of the carrier frequency or the system bandwidth in the extended CC and normal communication in the extended CC after the VPCI is set as the PCI in processing of the extended CC within the mobile station device in the scheduling unit 608 are performed (step S1008).

According to the embodiment as described above, in a system in which a mobile station device identifies a cell by referring to a synchronization signal, performs parameter setting unique to the cell, and uses a plurality of CCs, a CC into which a synchronization signal is inserted and a CC into which no synchronization signal is inserted are introduced with use of a different parameter for each CC and a VPCI of the CC into which no synchronization signal is inserted is broadcast in the CC into which the synchronization signal is inserted, thereby reducing synchronization signal detection, that is, the number of cell searches. Also, it is possible to reduce an overhead by the synchronization signal.

According to the embodiment, in a system in which a mobile station device identifies a cell by referring to a synchronization signal, performs parameter setting unique to the cell, and uses a plurality of CCs, a CC into which a synchronization signal is inserted and a CC into which no synchronization signal is inserted are introduced and a VPCI of the CC into which no synchronization signal is inserted is broadcast in the CC into which the synchronization signal is inserted. Thereby, it is possible to perform communication using a different parameter for each CC while reducing an overhead by the synchronization signal, and obtain the diversity effect between the CCs. Also, it is possible to reduce a load of a transmission/reception circuit.

According to the embodiment, a PCI in which a CC is a synchronization CC is used as a VPCI of a CC changed to an extended CC when any synchronization CC is changed to the extended CC, so that communication can be performed without changing a transmission parameter upon the change.

(Second Embodiment)

The second embodiment of the present invention will be described. A base station device and a mobile station device according to the embodiment may be implemented by substantially the same block configurations as those of the base station device 100 and the mobile station device 200 shown in FIGS. 5, 6, 7, and 8 described in the first embodiment. Hereinafter, differences from the first embodiment of FIGS. 5, 6, 7, and 8 according to a sequence of PCI setting of each CC related to the embodiment will be described.

Figure 11:
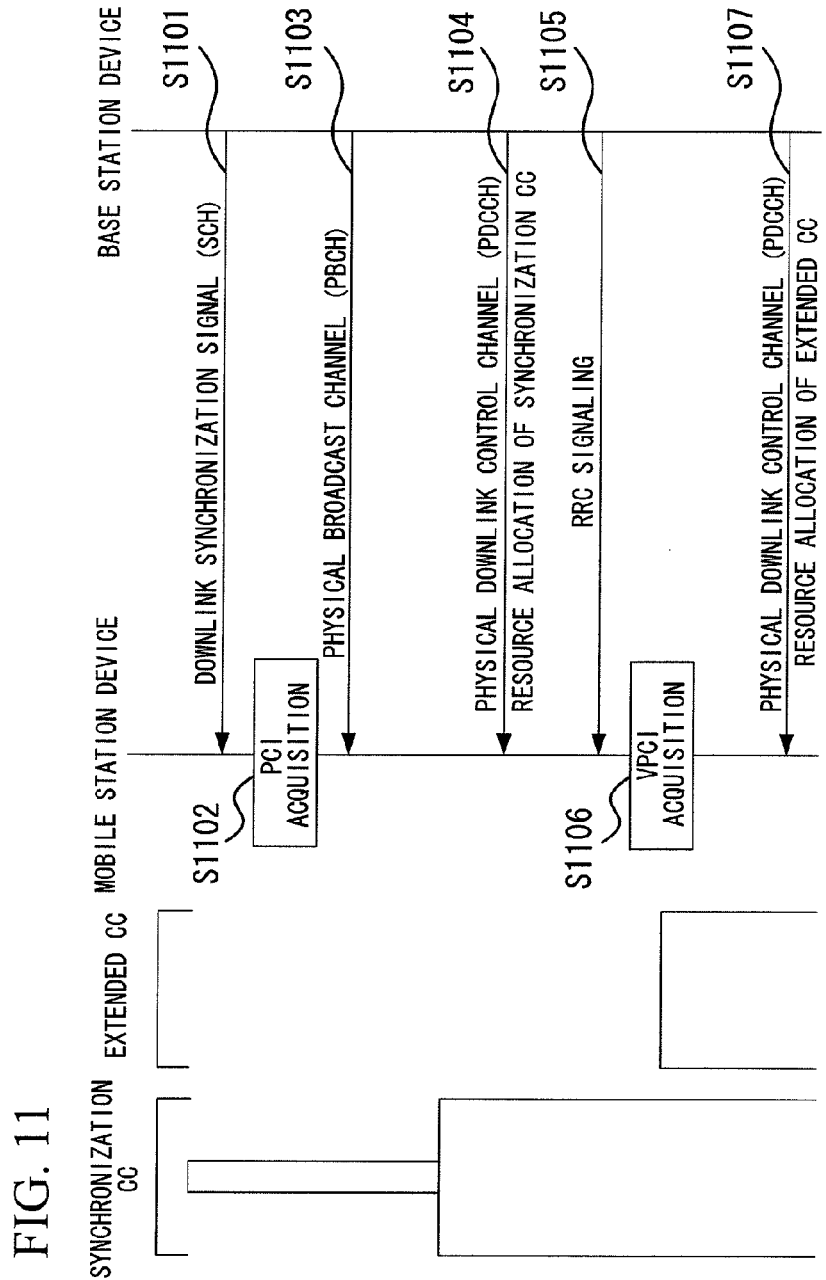
FIG. 11 is a sequence diagram showing another example of the processing of the wireless communication system according to the embodiment of the present invention.

FIG. 11 is a sequence diagram showing processing of the wireless communication system according to the embodiment. First, the base station device 100 transmits a downlink synchronization signal corresponding to a PCI in a synchronization CC (step S1101).

The mobile station device 200 acquires the downlink synchronization signal transmitted from the base station device 100 by cell selection or cell re-selection processing, and acquires the PCI of the synchronization CC by performing downlink synchronization processing (step S1102). In this case, synchronization processing is performed for a CC (synchronization CC) into which a downlink synchronization signal is inserted without detecting a CC (extended CC) into which no downlink synchronization signal is inserted.

The mobile station device 200 acquires a PBCH so that processing is performed in the synchronization CC (or so that manipulation is performed in the synchronization CC) (step S1103). In this case, information regarding the synchronization CC, that is, information indicating a system bandwidth of the synchronization CC (the number of resource blocks) or the like, is acquired from the PBCH. Further, the processing is continuously performed so that the manipulation is performed in the synchronization CC (step S1104).

The mobile station device 200 performs RRC connection establishment processing in the synchronization CC and establishes a communication state (RRC connection state) (step S1105). A common control channel (CCCH) (RRC signaling) for RRC connection setup during the RRC connection establishment processing or a dedicated control channel (DCCH) (RRC signaling) directed to the mobile station device 200 during communication is data from the radio resource control unit 510 of the base station device 100, and is mapped to a DL-SCH, which is one of transport channels, and transmitted to the mobile station device 200 via a PDSCH of the physical layer. The mobile station device 200 extracts the DL-SCH by the data extraction unit 607 and transmits the DL-SCH as the common control channel or the dedicated control channel from the scheduling unit 608 to the radio resource control unit 610 of the upper layer 609.

In this RRC signaling, a virtual PCI of each extended CC may be included along with information regarding an aggregation resource region, that is, information indicating a carrier frequency or a system bandwidth (the number of resource blocks) of the extended CC, or the like. The mobile station device 200 acquires the virtual PCI by its broadcast information channel (step S1106). Thereby, at least information indicating the VPCI referred to by the data control unit 501 corresponding to the extended CC is reported from the radio resource control unit 510 of the upper layer 509 of the base station device 100 to the radio resource control unit 610 of the upper layer 609 of the mobile station device 200.

Setting of the carrier frequency or the system bandwidth in the extended CC and normal communication in the extended CC after the VPCI are set as the PCI in processing of the extended CC within the mobile station device in the scheduling unit 608 are performed (step S1107).

The case where a VPCI is broadcast by the RRC signaling in the sequence shown in FIG. 11 has been described, but the present invention is not limited thereto. The VPCI is uniquely determined by information reported by the RRC signaling and the PCI (and/or other broadcast information, control information, or the like), so that the same effect can be obtained. For example, the same effect can be obtained even when a method of calculating a VPCI from a CCID and a PCI is predefined and implicitly shared between the base station device and the mobile station device. A method of generating a table of a VPCI corresponding to a CCID and a PCI and referring to the table or a calculation method by a numerical expression VPCI(k)=mod((PCI+CCID×a), (MPCI+1)) may be used as a VPCI calculation method. Here, mod is a modulo function (remainder function) and MPCI is a maximum value capable of being taken by a PCI. Also, a is a constant.

Figure 12:
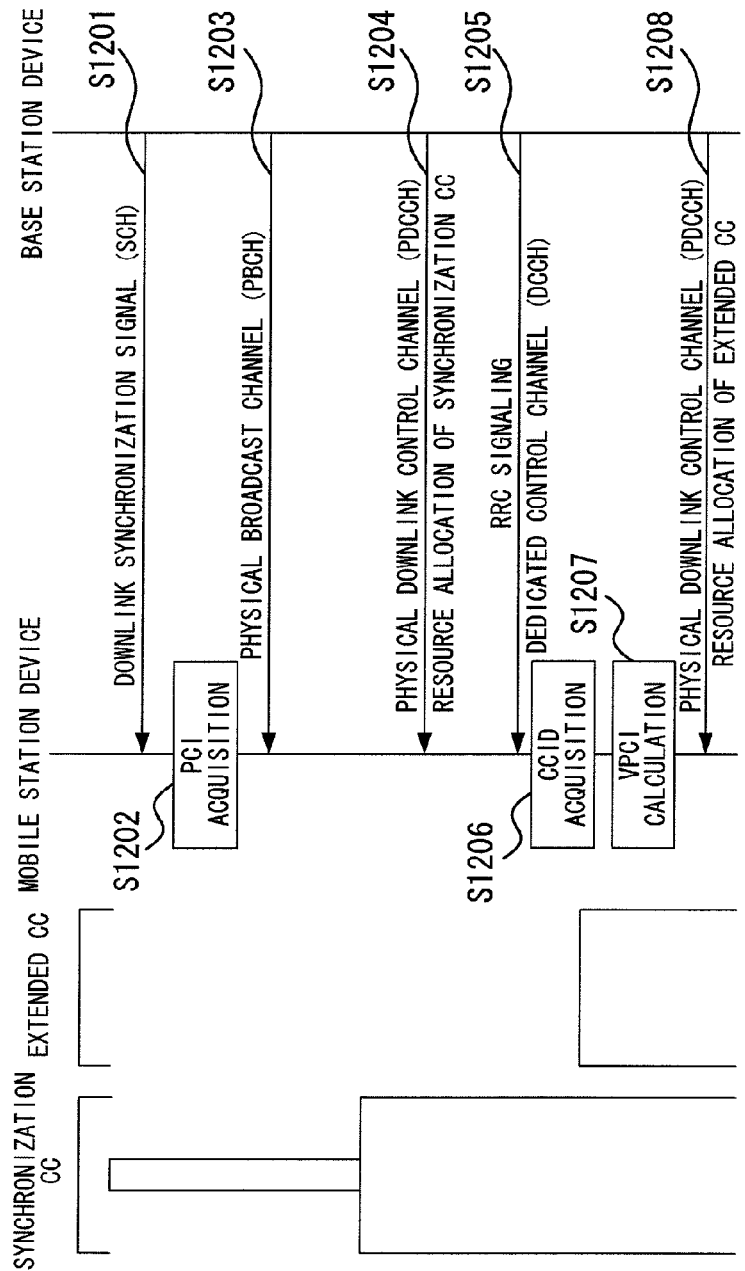
FIG. 12 is a sequence diagram showing another example of the processing of the wireless communication system according to the embodiment of the present invention.

FIG. 12 is a sequence diagram showing another example of processing of the wireless communication system according to the embodiment. First, the base station device 100 transmits a downlink synchronization signal corresponding to a PCI in a synchronization CC (step S1201).

The mobile station device 200 acquires the downlink synchronization signal transmitted from the base station device 100 by cell selection or cell re-selection processing, and acquires the PCI of the synchronization CC by performing downlink synchronization processing (step S1202). In this case, synchronization processing is performed for a CC (synchronization CC) into which a downlink synchronization signal is inserted without detecting a CC (extended CC) into which no downlink synchronization signal is inserted.

The mobile station device 200 acquires a PBCH so that processing is performed in the synchronization CC (or so that manipulation is performed in the synchronization CC) (step S1203). In this case, information regarding the synchronization CC, that is, information indicating a system bandwidth of the synchronization CC (the number of resource blocks) or the like, is acquired from the PBCH. Further, the processing is continuously performed so that the manipulation is performed in the synchronization CC (step S1204).

The mobile station device 200 performs RRC connection establishment processing in the synchronization CC and establishes a communication state (RRC connection state) (step S1205). In this RRC signaling, information regarding an aggregation resource region, that is, information indicating a CCID, a carrier frequency, or a system bandwidth (the number of resource blocks) of the extended CC, or the like, may be included. The mobile station device 200 acquires the CCID by its broadcast information channel (step S1206). The mobile station device 200 acquires a VPCI of the extended CC from the PCI of the synchronization CC and the CCID of each CC (step S1207). Thereby, at least information indicating the VPCI referred to by the data control unit 501 corresponding to the extended CC is shared between the base station device 100 and the mobile station device 200.

Setting of the carrier frequency or the system bandwidth in the extended CC and normal communication in the extended CC after the VPCI is set as the PCI in processing of the extended CC within the mobile station device in the scheduling unit 608 are performed (step S1208).

According to the embodiment as described above, in a system in which a mobile station device identifies a cell by referring to a synchronization signal, performs parameter setting unique to the cell, and uses a plurality of CCs, a CC into which a synchronization signal is inserted and a CC into which no synchronization signal is inserted are introduced with use of a different parameter for each CC and a VPCI of the CC into which no synchronization signal is inserted is reported in the CC into which the synchronization signal is inserted, thereby reducing synchronization signal detection, that is, the number of cell searches. Also, it is possible to reduce an overhead by the synchronization signal.

According to the embodiment, in a system in which a mobile station device identifies a cell by referring to a synchronization signal, performs parameter setting unique to the cell, and uses a plurality of CCs, a CC into which a synchronization signal is inserted and a CC into which no synchronization signal is inserted are introduced and a VPCI of the CC into which no synchronization signal is inserted is reported in the CC into which the synchronization signal is inserted. Thereby, it is possible to perform communication using a different parameter for each CC while reducing an overhead by the synchronization signal, and obtain the diversity effect between the CCs. Also, it is possible to reduce a load of a transmission/reception circuit.

(Third Embodiment)

The third embodiment of the present invention will be described. In the embodiment, description focusing on a downlink reference signal of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 13:
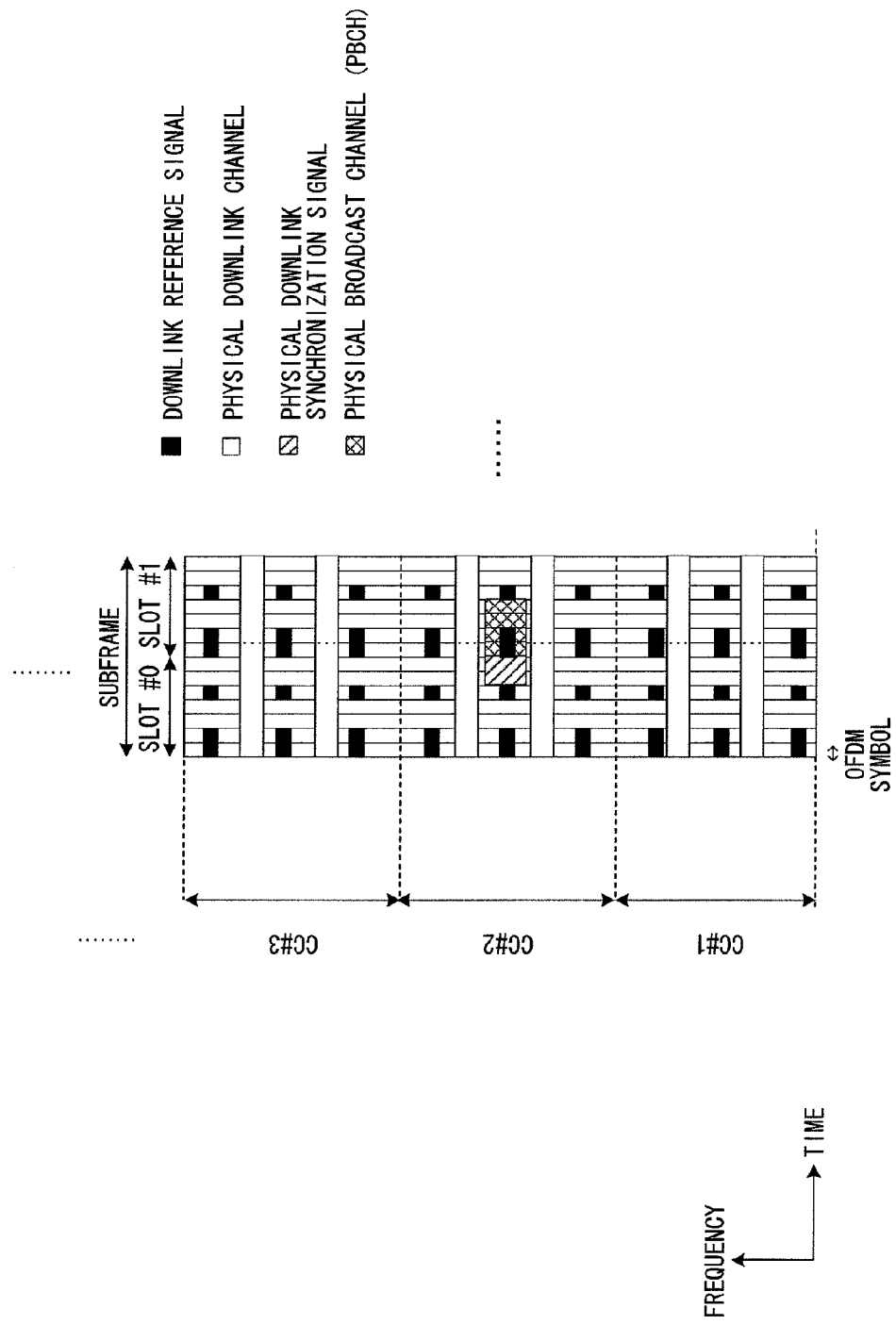
FIG. 13 is a diagram showing an example of a downlink frame configuration used in the communication system according to the embodiment of the present invention.

FIG. 13 is a diagram showing an example of a physical downlink frame format according to the embodiment. CC #2 is a synchronization CC and a physical downlink synchronization signal is inserted into a predetermined band of CC #2. CC #1 and CC #3 are extended CCs. Normally, no physical downlink synchronization signal is inserted into a band into which the physical downlink synchronization signal is inserted.

A stream to be used in a downlink reference signal of CC #2 is generated according to a predetermined generation rule based on the same PCI as that corresponding to the physical downlink synchronization signal inserted into CC #2 in the reference signal generation unit 703 within the data control unit 501 corresponding to CC #2 of the base station device 100. An index of a resource element in which the downlink reference signal of CC #2 is arranged is generated according to a predetermined generation rule based on the same PCI as that corresponding to the physical downlink synchronization signal inserted into CC #2 in the physical mapping unit 708 within the data control unit 501 corresponding to CC #2 of the base station device 100. In the same procedure, a stream to be used in the downlink reference signal and an index of a resource element to be arranged are also generated in other synchronization CCs.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, and sets the acquired PCI in the channel estimation unit 605. The channel estimation unit 605 generates a stream according to a predetermined generation rule based on the set PCI. An index of a resource element in which the downlink reference signal of CC #2 is arranged is generated according to a predetermined generation rule based on the set PCI, and the downlink reference signal is extracted from a signal received in the radio reception unit 604 corresponding to CC #2. The channel estimation unit 605 compares the generated stream with the extracted downlink reference signal, so that channel estimation is performed in CC #2. In the same procedure, the channel estimation is also performed in other synchronization CCs.

A stream to be used in a downlink reference signal of CC #1 is generated according to a predetermined generation rule based on a VPCI in CC #1 in the reference signal generation unit 703 within the data control unit 501 corresponding to CC #1 of the base station device 100. An index of a resource element in which the downlink reference signal of CC #1 is arranged is generated according to a predetermined generation rule based on a VPCI of CC #2 in the physical mapping unit 708 within the data control unit 501 corresponding to CC #1 of the base station device 100. In the same procedure, a stream to be used in a downlink reference signal and an index of a resource element to be arranged are also generated in other extended CCs.

The scheduling unit 608 of the mobile station device 200 acquires the VPCI corresponding to CC #1, and sets the acquired VPCI in the channel estimation unit 605. The channel estimation unit 605 generates a stream according to a predetermined generation rule based on the set VPCI. An index of a resource element in which the downlink reference signal of CC #1 is arranged is generated according to a predetermined generation rule based on the set VPCI, and the downlink reference signal is extracted from a signal received in the radio reception unit 604 corresponding to CC #1. The channel estimation unit 605 compares the generated stream with the extracted downlink reference signal, so that channel estimation is performed in CC #1. In the same procedure, the channel estimation is also performed in other extended CCs.

Rules different in a synchronization CC and an extended CC may be used as generation rules of a stream to be used in a downlink reference signal and an index of a resource element to be arranged. Further preferably, the same generation rule is used in terms of simplification.

As an example of a stream to be used in the downlink reference signal, a stream r of an l-th OFDM symbol of an s-th slot is designated as a pseudo-random number sequence c such as a Gold sequence and a value calculated from a PCI or VPCI is used as an initialization value of c, so that a different (or identical) sequence for each CC may be used.

As a VPCI is used as described above, inter-cell interference can be suppressed because it is possible to change a stream to be used in a downlink reference signal for each CC while reducing the number of cell searches or an overhead due to a synchronization signal by introducing a CC into which a downlink synchronization signal is inserted and a CC into which no downlink synchronization signal is inserted. Also, peak power can be reduced.

As an example of an index of a resource element to be arranged, a value calculated from a PCI or VPCI in an index k (subcarrier number) of an 1-th OFDM symbol of an s-th slot is incremented, so that a different (or identical) index (subcarrier number) for each CC may be used.

As a VPCI is used as described above, inter-cell interference can be suppressed because it is possible to change an insertion position of a downlink reference signal for each CC while reducing the number of cell searches or an overhead due to a synchronization signal by introducing a CC into which a downlink synchronization signal is inserted and a CC into which no downlink synchronization signal is inserted. Also, peak power can be reduced.

(Fourth Embodiment)

The fourth embodiment of the present invention will be described. In the embodiment, description focusing on a PBCH of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 14:
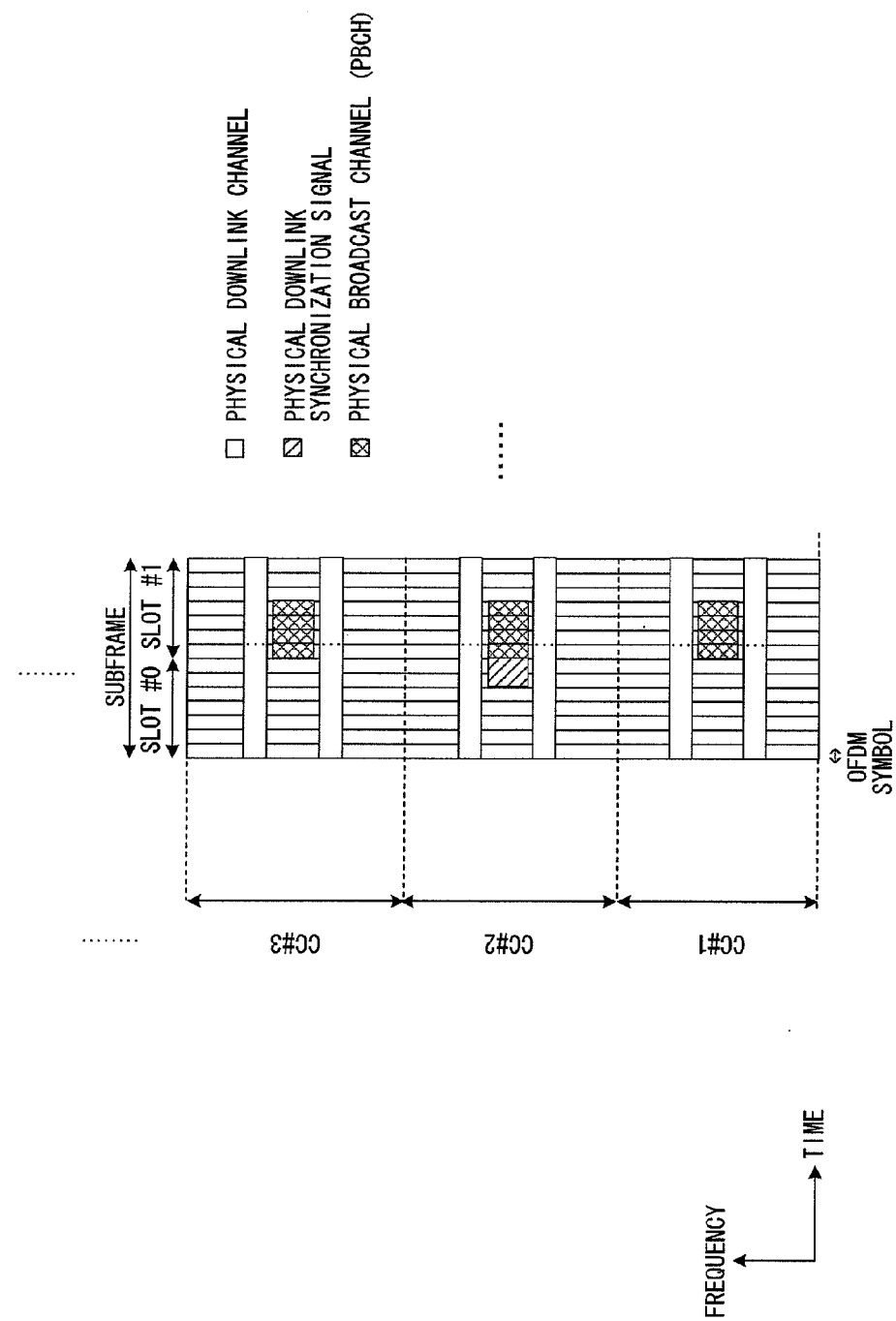
FIG. 14 is a diagram showing another example of the downlink frame configuration used in the communication system according to the embodiment of the present invention.

FIG. 14 is a diagram showing an example of a physical downlink frame format according to the embodiment. CC #2 is a synchronization CC and a physical downlink synchronization signal is inserted into a predetermined band of CC #2. CC #1 and CC #3 are extended CCs. Normally, no physical downlink synchronization signal is inserted into a band into which the physical downlink synchronization signal is inserted.

A PBCH of CC #2 is generated by scrambling a broadcast information channel based on the same PCI as that corresponding to a physical downlink synchronization signal inserted into CC #2 in the broadcast channel generation unit 701 within the data control unit 501 corresponding to CC #2 of the base station device 100. In the same procedure, PBCHs are also generated in other synchronization CCs.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, and sets the acquired PCI in the data extraction unit 607 corresponding to CC#2. The data extraction unit 607 corresponding to CC#2 extracts a broadcast information channel by descrambling a PBCH based on the set PCI. In the same procedure, broadcast information channels are also extracted in other synchronization CCs.

A PBCH of CC #1 is generated by scrambling a broadcast information channel based on a VPCI of CC #1 in the broadcast channel generation unit 701 within the data control unit 501 corresponding to CC #1 of the base station device 100. In the same procedure, PBCHs are also generated in other extended CCs.

The scheduling unit 608 of the mobile station device 200 acquires a VPCI corresponding to CC #1, and sets the acquired PCI in the data extraction unit 607 corresponding to CC #1. The data extraction unit 607 corresponding to CC #1 extracts a broadcast information channel by descrambling a PBCH based on the set VPCI. In the same procedure, broadcast information channels are also extracted in other extended CCs.

Rules different in a synchronization CC and an extended CC may be used as a scrambling rule for a PBCH. Further preferably, the same scrambling rule is used in terms of simplification. As an example of the scrambling rule, data b' after scrambling is calculated as b'=(b+c) mod2 using data b before scrambling. In this regard, c is designated as a pseudo-random number sequence such as a Gold sequence and mod is a modulo operator (remainder operator). A value calculated from a PCI or VPCI (or a value as it is) is used as an initialization value of c, so that different (or identical) scrambling for each CC can be performed.

As a VPCI is used as described above, inter-cell interference can be suppressed because it is possible to change a PBCH scrambling method for each CC while reducing the number of cell searches or an overhead due to a synchronization signal by introducing a CC into which a downlink synchronization signal is inserted and a CC into which no downlink synchronization signal is inserted.

(Fifth Embodiment)

The fifth embodiment of the present invention will be described. In the embodiment, description focusing on a PCFICH of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 15:
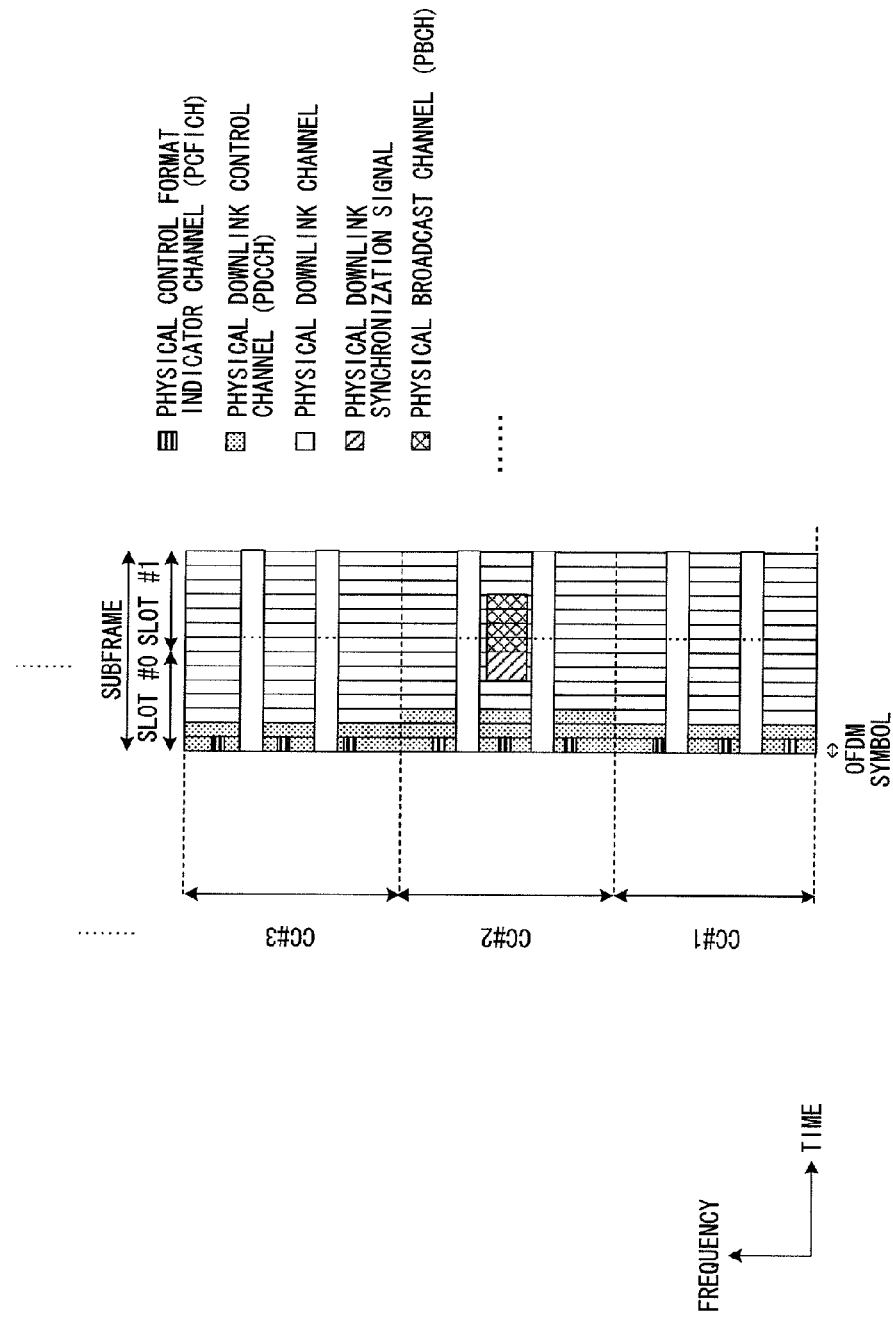
FIG. 15 is a diagram showing another example of the downlink frame configuration used in the communication system according to the embodiment of the present invention.

FIG. 15 is a diagram showing an example of a physical downlink frame format according to the embodiment. CC #2 is a synchronization CC and a physical downlink synchronization signal is inserted into a predetermined band of CC #2. CC #1 and CC #3 are extended CCs. Normally, no physical downlink synchronization signal is inserted into a band into which the physical downlink synchronization signal is inserted.

A PCFICH of CC #2 is generated by scrambling control data indicating a physical control format of CC #2 (data indicating the number of OFDM symbols in which a PDCCH is arranged) based on the same PCI as that corresponding to a physical downlink synchronization signal inserted into CC #2 in the physical control format indicator channel generation unit 704 within the data control unit 501 corresponding to CC #2 of the base station device 100. An index of a resource element in which the PCFICH of CC #2 is arranged is generated according to a predetermined generation rule based on the same PCI as that corresponding to a physical downlink synchronization signal inserted into CC#2 in the physical mapping unit 708 within the data control unit 501 corresponding to CC #2 of the base station device 100. In the same procedure in other synchronization CCs as well, a PCFICH is scrambled and an index of a resource element in which the PCFICH is arranged is generated.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, and sets the acquired PCI in the data extraction unit 607 corresponding to CC #2. The data extraction unit 607 corresponding to CC #2 generates an index of a resource element in which a PCFICH of CC #2 is arranged according to a predetermined generation rule based on the set PCI, and extracts the PCFICH from an OFDM signal. Based on the set PCI, control data is extracted by descrambling the PCFICH. In the same procedure, control data is also extracted from PCFICHs in other synchronization CCs.

A PCFICH of CC #1 is generated by scrambling control data indicating a physical control format of CC #1 (data indicating the number of OFDM symbols in which a PDCCH is arranged) based on a VPCI of CC #1 in the reference signal generation unit 703 within the data control unit 501 corresponding to CC #1 of the base station device 100. An index of a resource element in which the PCFICH of CC #1 is arranged is generated according to a predetermined generation rule based on a VPCI of CC #2 in the physical mapping unit 708 within the data control unit 501 corresponding to CC #1 of the base station device 100. In the same procedure in other extended CCs as well, a PCFICH is scrambled and an index of a resource element in which the PCFICH is arranged is generated.

The scheduling unit 608 of the mobile station device 200 acquires the VPCI corresponding to CC #1, and sets the acquired VPCI in the data extraction unit 607 corresponding to CC #1. The data extraction unit 607 corresponding to CC #1 generates an index of a resource element in which a PCFICH of CC #2 is arranged according to a predetermined generation rule based on the set VPCI, and extracts the PCFICH from an OFDM signal. Based on the set VPCI, control data is extracted by descrambling the PCFICH. In the same procedure, control data is also extracted from PCFICHs in other extended CCs.

Rules different in a synchronization CC and an extended CC may be used as a PCFICH scrambling rule and a rule of generating an index of a resource element to be arranged. In terms of simplification, further preferably, the same generation rule is used. The same scrambling as the scrambling described in the fourth embodiment may be used as an example of the scrambling rule.

As a VPCI is used as described above, inter-cell interference can be suppressed because it is possible to change a PCFICH scrambling method for each CC while reducing the number of cell searches or an overhead due to a synchronization signal by introducing a CC into which a downlink synchronization signal is inserted and a CC into which no downlink synchronization signal is inserted.

As an example of an index of a resource element to be arranged, a value calculated from a PCI or VPCI in an index k (subcarrier number) of an 1-th OFDM symbol of an s-th slot is incremented, so that a different (or identical) index (subcarrier number) for each CC can be used.

As a VPCI is used as described above, inter-cell interference can be suppressed because it is possible to change an insertion position of a PCFICH for each CC while reducing the number of cell searches or an overhead due to a synchronization signal by introducing a CC into which a downlink synchronization signal is inserted and a CC into which no downlink synchronization signal is inserted.

(Sixth Embodiment)

The sixth embodiment of the present invention will be described. In the embodiment, description focusing on a PHICH of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 16:
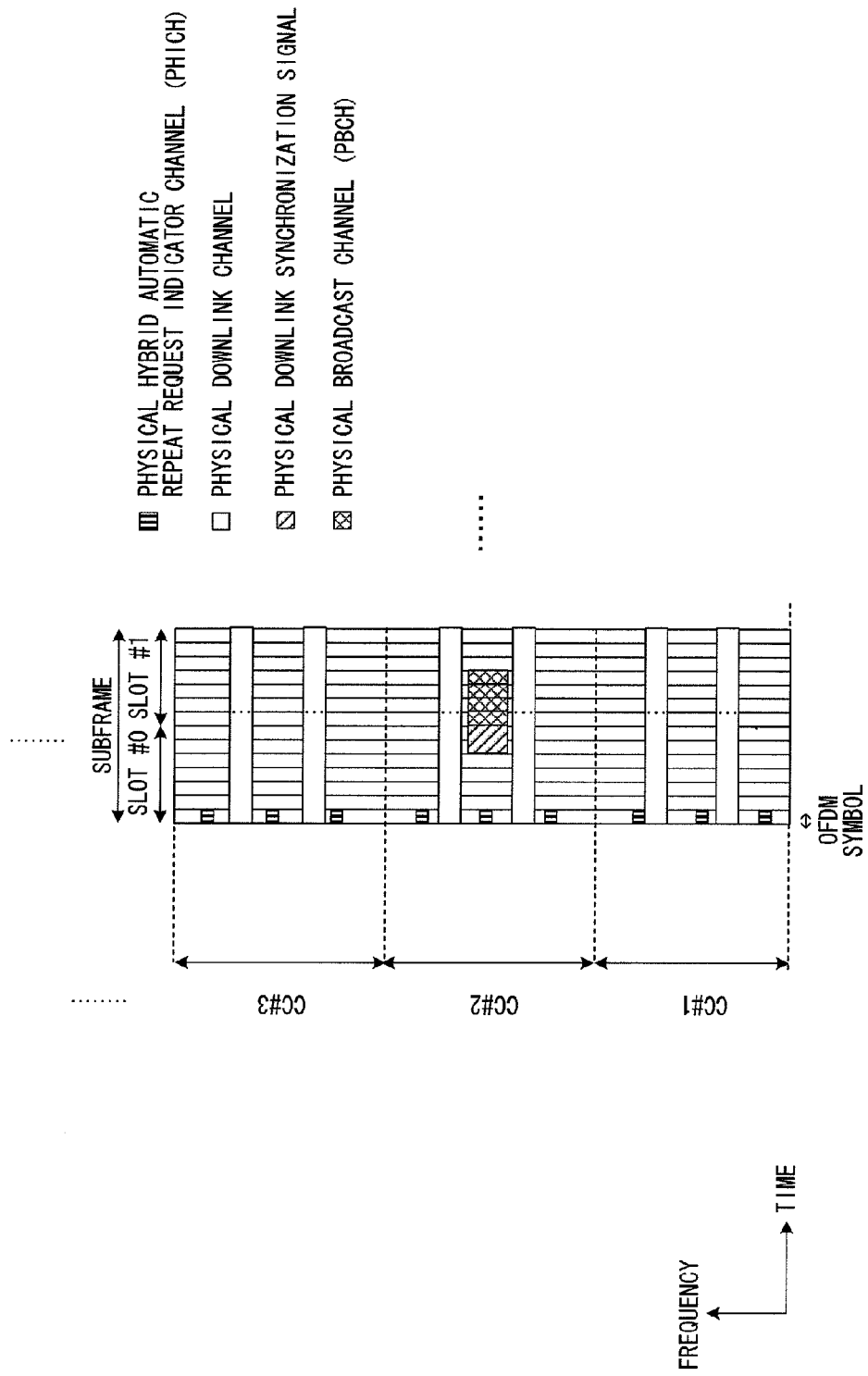
FIG. 16 is a diagram showing another example of the downlink frame configuration used in the communication system according to the embodiment of the present invention.

FIG. 16 is a diagram showing an example of a physical downlink frame format according to the embodiment. CC #2 is a synchronization CC and a physical downlink synchronization signal is inserted into a predetermined band of CC #2. CC #1 and CC #3 are extended CCs. Normally, no physical downlink synchronization signal is inserted into a band into which the physical downlink synchronization signal is inserted.

A PHICH of CC #2 is generated by scrambling response information of CC #2 responding to uplink transmission data based on the same PCI as that corresponding to a physical downlink synchronization signal inserted into CC #2 in the physical hybrid automatic repeat request indicator channel generation unit 705 within the data control unit 501 corresponding to CC #2 of the base station device 100. An index of a resource element in which the PHICH of CC #2 is arranged is generated according to a predetermined generation rule based on the same PCI as that corresponding to the physical downlink synchronization signal inserted into CC #2 in the physical mapping unit 708 within the data control unit 501 corresponding to CC #2 of the base station device 100. In the same procedure in other synchronization CCs as well, a PHICH is scrambled and an index of a resource element in which the PHICH is arranged is generated.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, and sets the acquired PCI in the data extraction unit 607 corresponding to CC #2. The data extraction unit 607 corresponding to CC #2 generates an index of a resource element in which a PHICH of CC #2 is arranged according to a predetermined generation rule based on the set PCI, and extracts the PHICH from an OFDM signal. Based on the set PCI, response information is extracted by descrambling the PHICH. In the same procedure, response information is also extracted from PHICHs in other synchronization CCs.

A PHICH of CC #1 is generated by scrambling response information of CC #1 responding to uplink transmission data based on a VPCI of CC #1 in the physical hybrid automatic repeat request indicator channel generation unit 705 within the data control unit 501 corresponding to CC #1 of the base station device 100. An index of a resource element in which the PHICH of CC #1 is arranged is generated according to a predetermined generation rule based on a VPCI of CC #2 in the physical mapping unit 708 within the data control unit 501 corresponding to CC #1 of the base station device 100. In the same procedure in other extended CCs as well, a PHICH is scrambled and an index of a resource element in which the PHICH is arranged is generated.

The scheduling unit 608 of the mobile station device 200 acquires the VPCI corresponding to CC #1, and sets the acquired VPCI in the data extraction unit 607 corresponding to CC #1. The data extraction unit 607 corresponding to CC #1 generates an index of a resource element in which a PHICH of CC #1 is arranged according to a predetermined generation rule based on the set VPCI, and extracts the PHICH from an OFDM signal. Based on the set VPCI, response information is extracted by descrambling the PHICH. In the same procedure, response information is also extracted from PHICHs in other extended CCs.

Rules different in a synchronization CC and an extended CC may be used as a PHICH scrambling rule and a rule of generating an index of a resource element to be arranged. In terms of simplification, further preferably, the same generation rule is used. As an example of the scrambling rule, a stream r of an 1-th OFDM symbol of an s-th slot is designated as a pseudo-random number sequence c such as a Gold sequence and a value calculated from a PCI or VPCI is used as an initialization value of c, so that a method of generating different scrambling code for each CC and multiplying it y response information can be used.

As a VPCI is used as described above, inter-cell interference can be suppressed because it is possible to change a PHICH scrambling method for each CC while reducing the number of cell searches or an overhead due to a synchronization signal by introducing a CC into which a downlink synchronization signal is inserted and a CC into which no downlink synchronization signal is inserted.

As an example of an index of a resource element to be arranged, a value calculated from a PCI or VPCI in an index k (subcarrier number) of an OFDM symbol of an s-th slot is incremented, so that a different (or identical) index (subcarrier number) for each CC can be used.

As a VPCI is used as described above, inter-cell interference can be suppressed because it is possible to change an insertion position of a PHICH for each CC while reducing the number of cell searches or an overhead due to a synchronization signal by introducing a CC into which a downlink synchronization signal is inserted and a CC into which no downlink synchronization signal is inserted.

(Seventh Embodiment)

The seventh embodiment of the present invention will be described. In the embodiment, description focusing on a PDCCH of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 17:
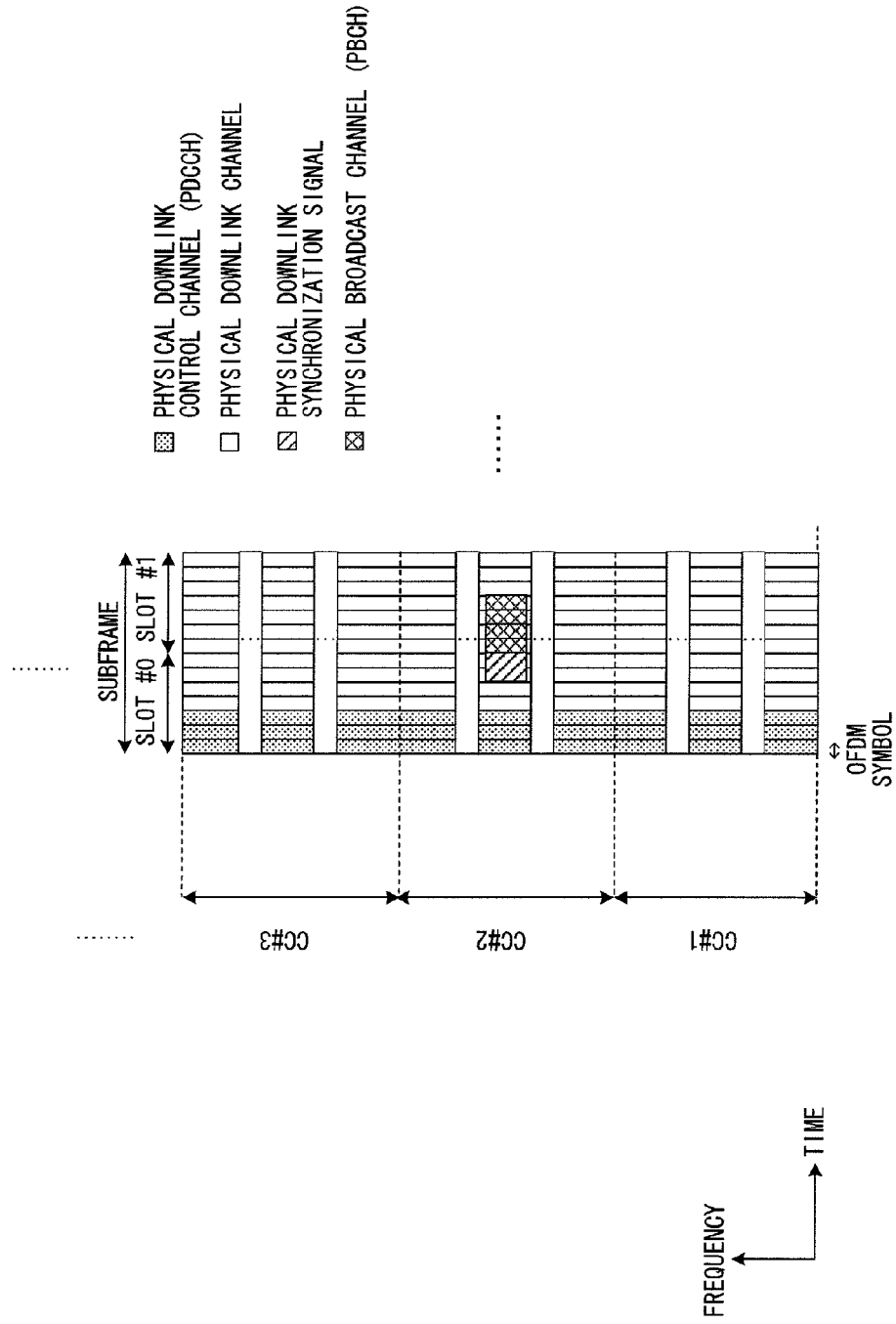
FIG. 17 is a diagram showing another example of the downlink frame configuration used in the communication system according to the embodiment of the present invention.

FIG. 17 is a diagram showing an example of a physical downlink frame format according to the embodiment. CC #2 is a synchronization CC and a physical downlink synchronization signal is inserted into a predetermined band of CC #2. CC #1 and CC #3 are extended CCs. Normally, no physical downlink synchronization signal is inserted into a band into which the physical downlink synchronization signal is inserted.

A PDCCH of CC #2 is generated by scrambling downlink control information to be transmitted in CC #2 based on the same PCI as that corresponding to a physical downlink synchronization signal inserted into CC #2 in the downlink control channel generation unit 707 within the data control unit 501 corresponding to CC #2 of the base station device 100. An interleaving pattern for the PDCCH of CC #2 is generated according to a predetermined generation rule based on the same PCI as that corresponding to the physical downlink synchronization signal inserted into CC #2 in the physical mapping unit 708 within the data control unit 501 corresponding to CC #2 of the base station device 100. In the same procedure in other synchronization CCs as well, a PDCCH is scrambled, interleaved, and mapped.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, and sets the acquired PCI in the data extraction unit 607 corresponding to CC #2. The data extraction unit 607 corresponding to CC #2 performs deinterleaving by generating an interleaving pattern of the PDCCH of CC #2 according to a predetermined generation rule based on the set PCI, and extracts the PDCCH from an OFDM signal. Based on the set PCI, response information is extracted by descrambling the PDCCH. In the same procedure, downlink control information is also extracted from PDCCHs in other synchronization CCs.

A PDCCH of CC #1 is generated by scrambling downlink control information to be transmitted in CC #1 based on a VPCI of CC #1 in the downlink control channel generation unit 706 within the data control unit 501 corresponding to CC #1 of the base station device 100. An interleaving pattern of the PDCCH corresponding to CC #1 is generated according to a predetermined generation rule based on a VPCI of CC #2 in the physical mapping unit 708 within the data control unit 501 corresponding to CC #1 of the base station device 100. In the same procedure in other extended CCs as well, a PDCCH is scrambled, interleaved, and mapped.

The scheduling unit 608 of the mobile station device 200 acquires the VPCI corresponding to CC #1, and sets the acquired VPCI in the data extraction unit 607 corresponding to CC #1. The data extraction unit 607 corresponding to CC #1 performs deinterleaving by generating an interleaving pattern of the PDCCH of CC #1 according to a predetermined generation rule based on the set VPCI, and extracts the PDCCH from an OFDM signal. Based on the set VPCI, downlink control information is extracted by descrambling the PDCCH. In the same procedure, downlink control information is also extracted from PDCCHs in other extended CCs.

Rules different in a synchronization CC and an extended CC may be used as a PDCCH scrambling rule and a rule of generating an index of a resource element to be arranged. In terms of simplification, further preferably, the same generation rule is used. The same scrambling as the scrambling described in the fourth embodiment may be used as an example of the scrambling rule.

As a VPCI is used as described above, inter-cell interference can be suppressed because it is possible to change a PDCCH scrambling method for each CC while reducing the number of cell searches or an overhead due to a synchronization signal by introducing a CC into which a downlink synchronization signal is inserted and a CC into which no downlink synchronization signal is inserted.

As an example of interleaving, a different interleaving pattern may be used for each CC by cyclically shifting a value calculated from a PCI or VPCI to a predetermined interleaving pattern.

As a VPCI is used as described above, inter-cell interference can be suppressed because it is possible to change a PDCCH interleaving pattern for each CC while reducing the number of cell searches or an overhead due to a synchronization signal by introducing a CC into which a downlink synchronization signal is inserted and a CC into which no downlink synchronization signal is inserted.

(Eighth Embodiment)

The eighth embodiment of the present invention will be described. In the embodiment, description focusing on a PUCCH of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 18:
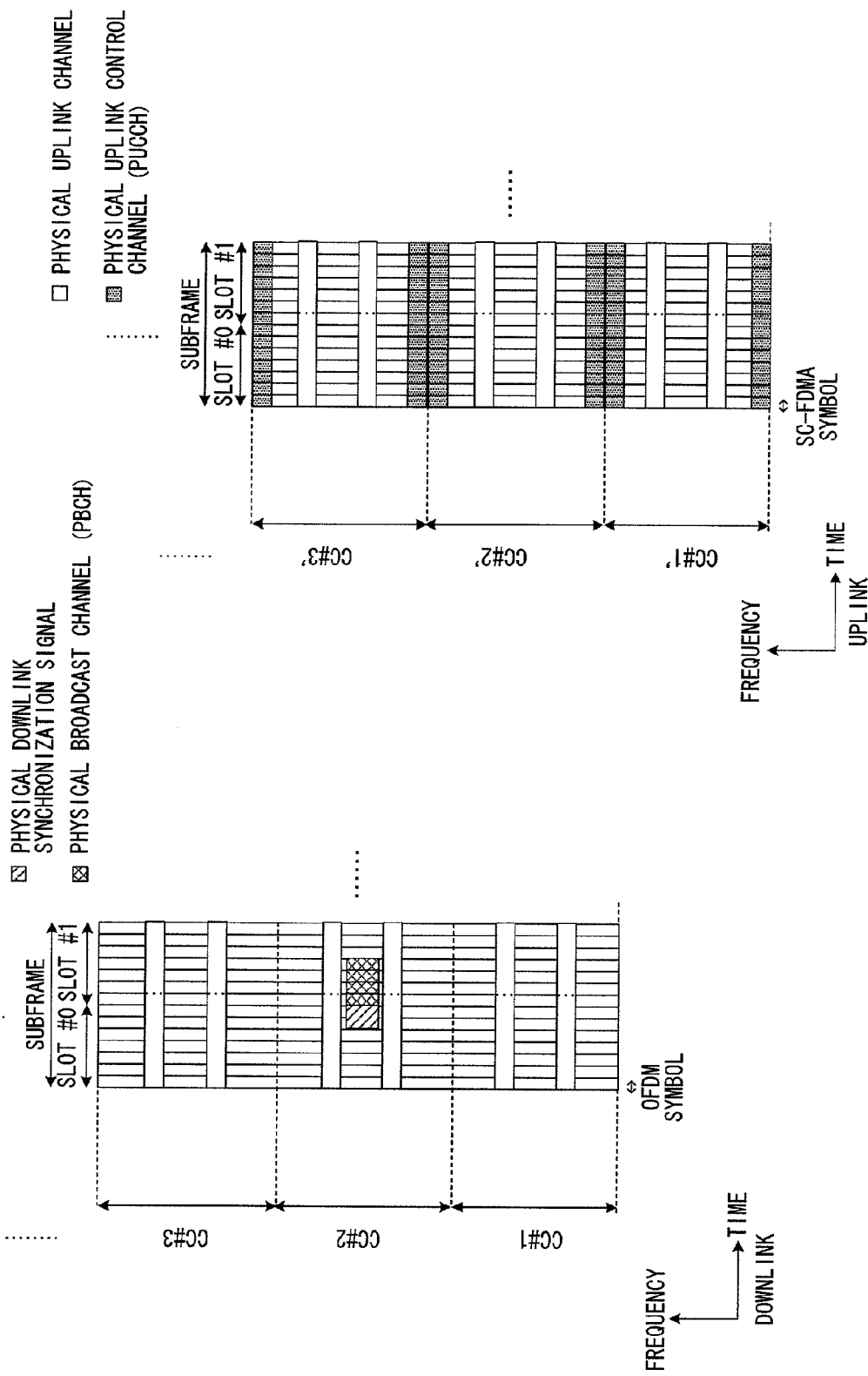
FIG. 18 is a diagram showing an example of downlink and uplink frame configurations used in the communication system according to the embodiment of the present invention.

FIG. 18 is a diagram showing an example of a physical downlink frame format and a physical uplink frame format according to the embodiment. CC #2 is a downlink synchronization CC and a physical downlink synchronization signal is inserted into a predetermined band of CC #2. CC #1 and CC #3 are extended CCs of the downlink Normally, no physical downlink synchronization signal is inserted into a band into which the physical downlink synchronization signal is inserted.

On the other hand, CC #2' is an uplink synchronization CC, and is an uplink CC corresponding to CC #2 of the downlink. CC #1' and CC #3' are extended CCs of the uplink, and are uplink CCs respectively corresponding to CC #1 and CC #3 of the downlink. A physical downlink synchronization signal corresponding to a PCI is inserted into CC #2 of the base station device 100.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, sets the acquired PCI in the data extraction unit 607 corresponding to CC #2, and also sets the acquired PCI in the data control unit 601 corresponding to CC #2', which is an uplink CC corresponding to CC #2. The uplink control channel generation unit 803 within the data control unit 601 in which the acquired PCI is set generates an uplink control channel by scrambling uplink control information based on the set PCI. The physical mapping unit 806 within the data control unit 601 in which the acquired PCI is set outputs a cyclic shift amount according to a predetermined generation rule based on the set PCI, and maps the uplink control channel to a resource corresponding to the cyclic shift amount.

By an instruction of the scheduling unit 608, the base station device 100 sets a PCI corresponding to a physical downlink synchronization signal inserted into CC #2 in the data extraction unit 607 corresponding to CC #2', which is an uplink CC corresponding to CC #2. The data extraction unit 607 in which the PCI is set specifies a resource based on the set PCI, and extracts a PUCCH from an SC-FDMA signal. Uplink control information is acquired by performing descrambling based on the set PCI. In the same procedure, PUCCH transmission/reception is also performed in uplink CCs corresponding to other downlink synchronization CCs.

The scheduling unit 608 of the mobile station device 200 acquires a VPCI of CC #1, sets the acquired VPCI in the data extraction unit 607 corresponding to CC #1, and also set the acquired VPCI in the data control unit 601 corresponding to CC #1', which is an uplink CC corresponding to CC #1. The uplink control channel generation unit 803 within the data control unit 601 in which the acquired VPCI is set generates an uplink control channel by scrambling uplink control information based on the set VPCI. The physical mapping unit 806 within the data control unit 601 in which the acquired VPCI is set outputs a cyclic shift amount according to a predetermined generation rule based on the set VPCI, and maps the uplink control channel to a resource corresponding to a cyclic shift amount.

The base station device 100 sets a VPCI of CC #1 reported to the mobile station device 200 in the data extraction unit 607 corresponding to CC #1', which is an uplink CC corresponding to CC #1. The data extraction unit 607 in which the VPCI is set generates a hopping pattern based on the set VPCI, and extracts a PUCCH from a slot-hopped SC-FDMA signal. Uplink control information is acquired by performing descrambling based on the set VPCI. In the same procedure, PUCCH transmission/reception is also performed in uplink CCs corresponding to other extended CCs of the downlink.

Rules different in a synchronization CC and an extended CC may be used as a PDCCH scrambling rule and a rule of generating an index of a resource element to be arranged. In terms of simplification, further preferably, the same generation rule is used. The same scrambling as the scrambling described in the fourth embodiment may be used as an example of the scrambling rule.

As a VPCI is used as described above, inter-cell interference can be suppressed because it is possible to change a PDCCH scrambling method for each CC while reducing the number of cell searches or an overhead due to a synchronization signal by introducing a CC into which a downlink synchronization signal is inserted and a CC into which no downlink synchronization signal is inserted.

(Ninth Embodiment)

The ninth embodiment of the present invention will be described. In the embodiment, description focusing on an uplink reference signal of each CC is given. A base station device and a mobile station device according to the embodiment may be implemented by substantially the same block configurations as those of the base station device 100 and the mobile station device 200 shown in FIGS. 5, 6, 7, and 8 described in the first embodiment or the second embodiment.

Figure 19:
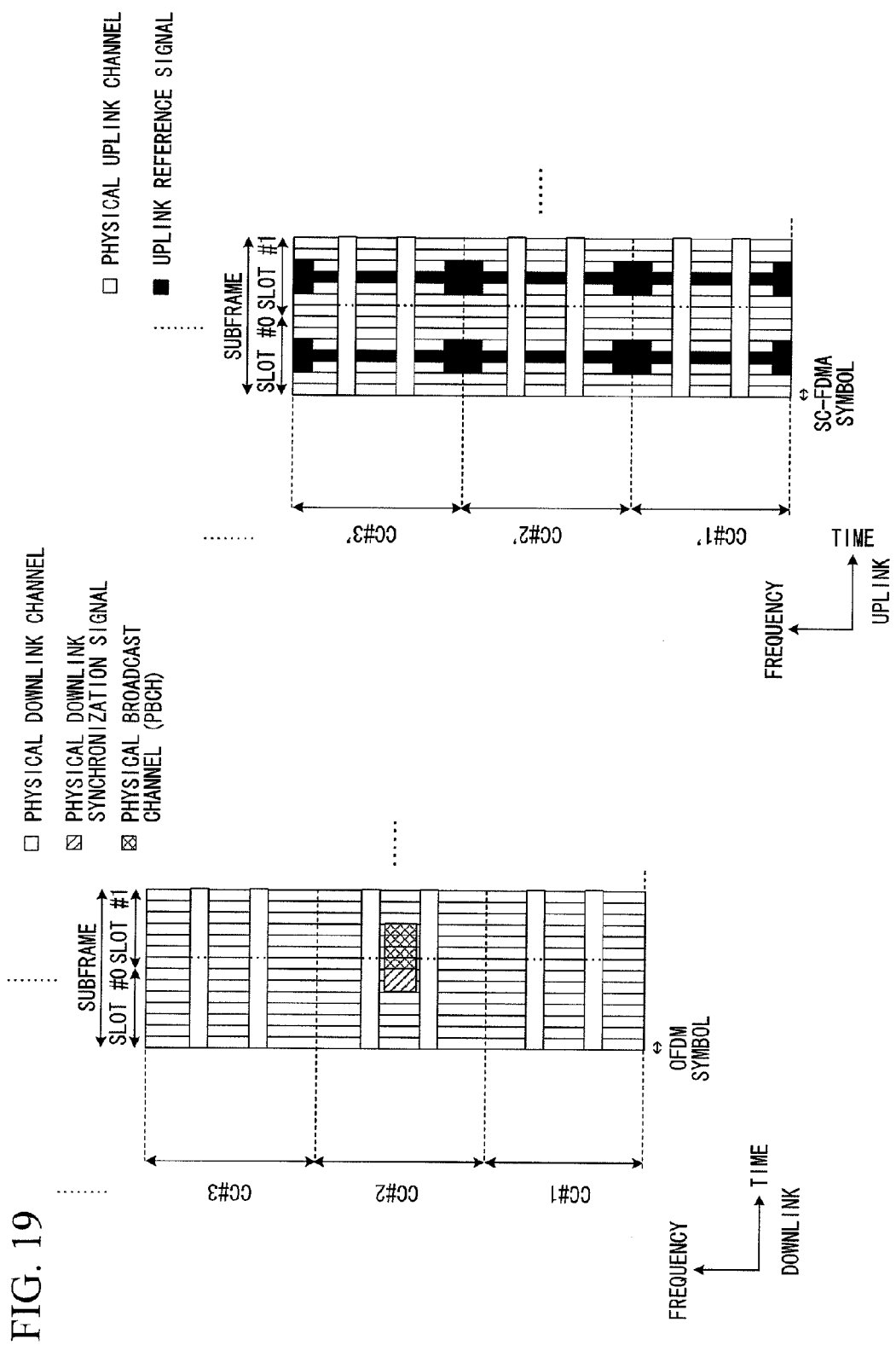
FIG. 19 is a diagram showing another example of the downlink and uplink frame configurations used in the communication system according to the embodiment of the present invention.
Figure 20:
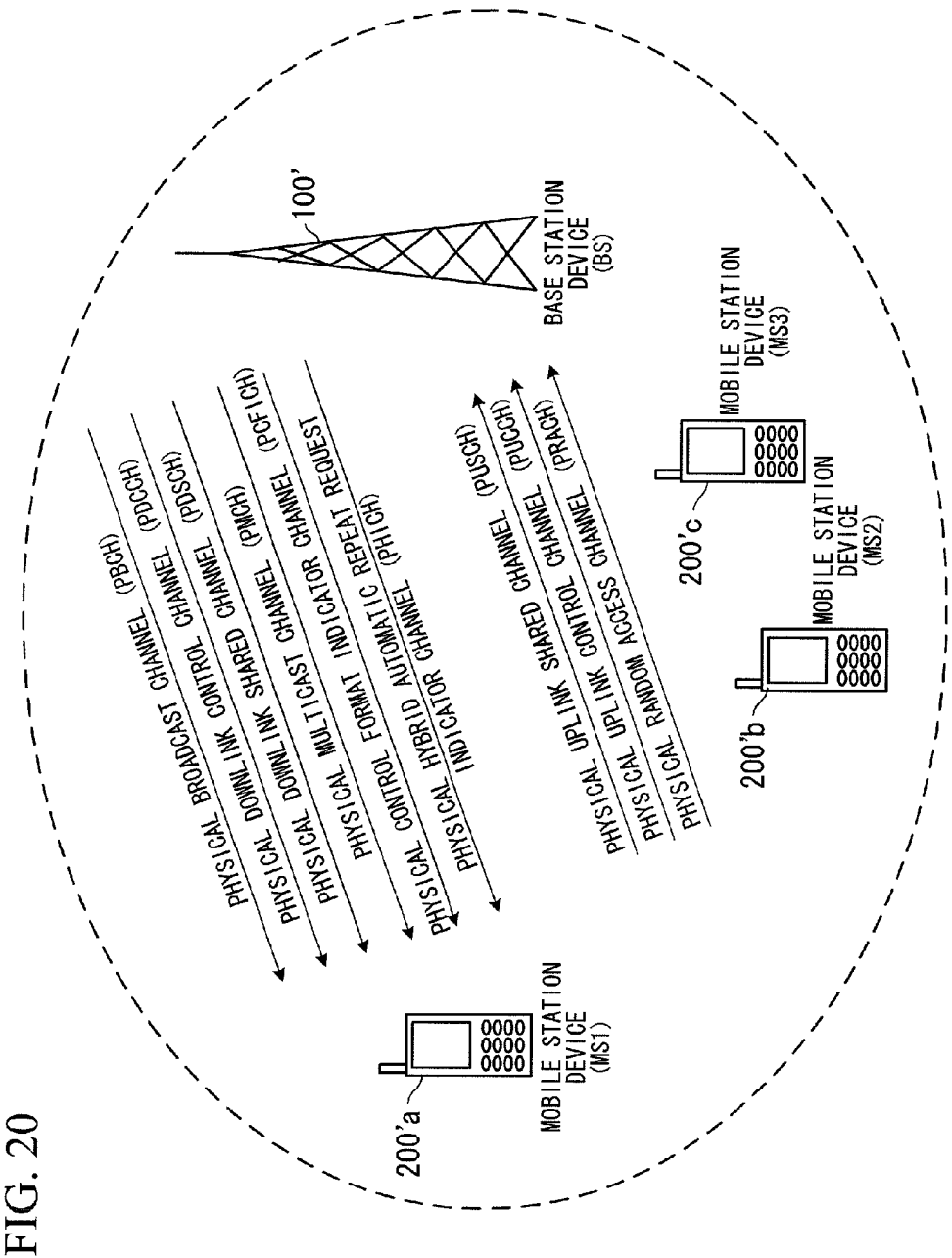
FIG. 20 is a diagram showing a channel configuration used in a wireless communication system of the related art.

FIG. 19 is a diagram showing an example of a physical downlink frame format and a physical uplink frame format according to the embodiment. CC #2 is a downlink synchronization CC and a physical downlink synchronization signal is inserted into a predetermined band of CC #2. CC #1 and CC #3 are extended CCs of the downlink. Normally, no physical downlink synchronization signal is inserted into a band into which the physical downlink synchronization signal is inserted.

On the other hand, CC #2' is an uplink synchronization CC, and is an uplink CC corresponding to CC #2 of the downlink. CC #1' and CC #3' are extended CCs of the uplink, and are uplink CCs respectively corresponding to CC #1 and CC #3 of the downlink. A physical downlink synchronization signal corresponding to a PCI is inserted into CC #2 of the base station device 100.

After the radio reception unit 604 and the data extraction unit 607 corresponding to CC #2 of the mobile station device 200 perform a cell search, the scheduling unit 608 acquires a PCI corresponding to a physical downlink synchronization signal inserted into CC #2, sets the acquired PCI in the data extraction unit 607 corresponding to CC #2, and also sets the acquired PCI in the data control unit 601 corresponding to CC #2', which is an uplink CC corresponding to CC #2. The reference signal generation unit 801 within the data control unit 601 in which the acquired PCI is set generates a reference signal stream by a predetermined generation rule based on the set PCI. The physical mapping unit 806 within the data control unit 601 in which the acquired PCI is set outputs a cyclic shift amount according to a predetermined generation rule based on the set PCI, and maps the uplink reference signal to a resource corresponding to the cyclic shift amount.

By an instruction of the scheduling unit 608, the base station device 100 sets a PCI corresponding to a physical downlink synchronization signal inserted into CC #2 in the channel estimation unit 505. The channel estimation unit 505 specifies a resource corresponding to a cyclic shift amount based on the set PCI, and extracts an uplink reference signal received from a slot-hopped SC-FDMA signal. A stream is generated by a predetermined generation rule based on the set PCI and channel estimation is performed from the generated stream and the received uplink reference signal. In the same procedure, the channel estimation is also performed in uplink CCs corresponding to other downlink synchronization CCs.

The scheduling unit 608 of the mobile station device 200 acquires a VPCI of CC #1, sets the acquired VPCI in the data extraction unit 607 corresponding to CC #1, and also sets the acquired VPCI in the data control unit 601 corresponding to CC #1', which is an uplink CC corresponding to CC #1. The reference signal generation unit 801 within the data control unit 601 in which the acquired VPCI is set generates a reference signal stream by a predetermined generation rule based on the set VPCI. The physical mapping unit 806 within the data control unit 601 in which the acquired VPCI is set outputs a cyclic shift amount according to a predetermined generation rule based on the set VPCI, and maps the uplink reference signal to a resource corresponding to the cyclic shift amount.

By an instruction of the scheduling unit 608, the base station device 100 sets a VPCI of CC #2 reported to the mobile station device 200 in the channel estimation unit 505. The channel estimation unit 505 specifies a resource corresponding to a cyclic shift amount based on the set PCI, and extracts an uplink reference signal received from a slot-hopped SC-FDMA signal. A stream is generated by a predetermined generation rule based on the set PCI and channel estimation is performed from the generated stream and the received uplink reference signal. In the same procedure, the channel estimation is also performed in uplink CCs corresponding to other extended CCs of the downlink.

Rules different in a synchronization CC and an extended CC may be used as an uplink reference signal stream generation rule and a rule of calculating a cyclic shift amount designating a resource. In terms of simplification, further preferably, the same generation rule is used.

As a VPCI is used as described above, inter-cell interference can be suppressed because it is possible to change an uplink reference signal stream for each CC and perform transmission using different resources while reducing the number of cell searches or an overhead due to a synchronization signal by introducing a CC into which a downlink synchronization signal is inserted and a CC into which no downlink synchronization signal is inserted.

The case where the number of downlink CCs and the number of uplink CCs are identical for convenience of description and CCs correspond in one-to-one relation has been described in each embodiment described above, but the present invention is not limited thereto. For example, if the number of uplink CCs is less than the number of downlink CCs and one uplink CC corresponds to a plurality of downlink CCs, it is possible to insert a synchronization channel into one CC of the plurality of downlink CCs and obtain the same effect if an individual PCI (or VPCI) is used for downlink-related parameter setting and uplink-related parameter setting using a PCI of a CC into which a synchronization channel is inserted in parameter setting of an uplink CC.

A specific example of each channel or each signal and a frame format has been described in each embodiment described above for convenience of description, but other channels or signals may be applied and a different frame format may also be applied.

An example in which a base station device and a mobile station device have a one-to-one relation has been described in each embodiment described above for convenience of description, but a plurality of base station devices and a plurality of mobile station devices may be provided. The mobile station device is not limited to a mobile terminal, and may be implemented by mounting a function of the mobile station device on a base station device or a fixed terminal.

In each embodiment described above, a program for implementing functions within the base station device or functions within the mobile station device may be recorded on a computer readable recording medium. The base station device or the mobile station device may be controlled by enabling a computer system to read and execute the program recorded on the recording medium. The "computer system" used herein includes an OS and hardware, such as peripheral devices.

The "computer readable recording medium" is a portable medium such as a flexible disk, magneto-optical disc, ROM and CD-ROM, and a storage device, such as a hard disk, built in the computer system. Furthermore, the "computer readable recording medium" may also include a medium that dynamically holds a program for a short period of time, such as a communication line when a program is transmitted via a network such as the Internet or a communication network such as a telephone network, and a medium that holds a program for a fixed period of time, such as a volatile memory in a computer system serving as a server or client in the above situation. The program may be one for implementing part of the above functions, or the above functions may be implemented in combination with a program already recorded on the computer system.

The embodiments of the present invention have been described in detail with reference to the drawings. However, specific configurations are not limited to the embodiments and may include any design in the scope without departing from the subject matter of the present invention.

Industrial Applicability

The present invention is preferably used in a mobile phone system in which a mobile phone terminal is a mobile station device, but is not limited thereto.

REFERENCE SYMBOLS

100, 100': Base station device
200, 200a, 200b, 200c, 200, 200a', 200b', 200c': Mobile station device
501, 501-1 to 501-m, 601, 601-1 to 601-n: Data control unit
502, 502-1 to 502-m: OFDM modulation unit
503, 503-1 to 503-m, 603, 603-1 to 603-n: Radio transmission unit
504, 504-1 to 504-n, 604, 604-1 to 604-m: Radio reception unit
505, 605: Channel estimation unit
506, 506-1 to 506-n: SC-FDMA demodulation unit
507, 507-1 to 507-n, 607, 607-1 to 607-m: Data extraction unit
508, 608: Scheduling unit
509, 609: Upper layer
510, 610: Radio resource control unit
602, 602-1 to 602-n: SC-FDMA modulation unit
607, 607-1 to 607-m: OFDM demodulation unit
701: Broadcast channel generation unit
702: Synchronization signal generation unit
703, 801: Reference signal generation unit
704: Physical control format indicator channel generation unit
705: Physical hybrid automatic repeat request indicator channel generation unit
706: Downlink control channel generation unit
707, 804: Modulation unit
708, 806: Physical mapping unit
709, 807: IFFT unit
710, 808: CP insertion unit
802: Physical random access channel generation unit
803: Uplink control channel generation unit
805: DFT generation unit

The invention claimed is:

1. A base station device which communicates with a mobile station device by configuring at least one cell, the base station device comprising:
a synchronization signal generation unit configured to generate a synchronization signal corresponding to a first cell identity for identifying the at least one cell; and a transmission unit configured to generate a first transmission signal including the synchronization signal using a first parameter obtained from the first cell identity, generate a second transmission signal using a second parameter obtained from a second cell identity different from the first cell identity, transmit the first transmission signal using a first frequency band, and transmit the second transmission signal using a second frequency band different from the first frequency band.

2. The base station device according to claim 1, wherein the transmission unit is further configured to generate the first transmission signal including information indicating the second cell identity.

3. The base station device according to claim 2, wherein the transmission unit is further configured to generate the first transmission signal including broadcast information, and
   the broadcast information includes the information indicating the second cell identity.

4. The base station device according to claim 2, wherein the transmission unit is further configured to generate the first transmission signal including upper-layer control information, which is control information of an upper layer, and
   the upper-layer control information includes the information indicating the second cell identity.

5. The base station device according to claim 1, wherein the transmission unit is further configured to generate the second transmission signal using the second parameter obtained from the second cell identity generated by a predetermined generation rule from the first cell identity.

6. The base station device according to claim 1, wherein the transmission unit comprises:
   a reference signal generation unit configured to generate a first reference signal using the first cell identity and generate a second reference signal using the second cell identity; and
   a data control unit configured to generate the first transmission signal by mapping the first reference signal and generate the second transmission signal by mapping the second reference signal.

7. The base station device according to claim 1, wherein the transmission signal generation unit comprises:
   a control information generation unit configured to generate a first control signal scrambled using the first cell identity and generate a second control signal scrambled using the second cell identity; and
   a data control unit configured to generate the first transmission signal by mapping the first control signal and generate the second transmission signal by mapping the second control signal.

8. The base station device according to claim 1, wherein the transmission unit comprises:
   a reference signal generation unit configured to generate a first reference signal to be transmitted in the first frequency band and a second reference signal to be transmitted in the second frequency band; and
   a data control unit configured to generate the first transmission signal by mapping the first reference signal to a position obtained from the first cell identity and generate the second transmission signal by mapping the second reference signal to a position obtained from the second cell identity.

9. A mobile station device which communicates with a base station device configuring at least one cell, the mobile station device comprising:
   a reception unit configured to receive a first reception signal including a synchronization signal corresponding to a first cell identity for identifying the at least one cell using a first parameter obtained from the first cell identity via a first frequency band and receive a second reception signal using a second parameter obtained from a second cell identity different from the first cell identity via a second frequency band; and
   a data extraction unit configured to extract information indicating the second cell identity from the first reception signal.

10. The mobile station device according to claim 9, wherein the reception unit comprises:
    a data extraction unit configured to extract broadcast information from the first reception signal; and
    a scheduling unit configured to acquire information indicating the second cell identity from the broadcast information.

11. The mobile station device according to claim 9, wherein the reception unit comprises:
    a data extraction unit configured to extract upper-layer control information, which is control information of an upper layer, from the first reception signal; and
    a radio resource control unit configured to acquire information indicating the second cell identity from the upper-layer control information.

12. The mobile station device according to claim 9, wherein the reception unit is further configured to receive the second reception signal using the second parameter obtained from the second cell identity generated by a predetermined generation rule from the first cell identity.

13. The mobile station device according to claim 9, wherein the reception unit comprises:
    a channel estimation unit configured to extract a first reference signal from the first reception signal based on a position obtained from the first cell identity and extract a second reference signal from the second reception signal based on a position obtained from the second cell identity.

14. The mobile station device according to claim 9, wherein the reception unit comprises:
    a channel estimation unit configured to perform channel estimation of the first frequency band using a stream obtained from the first cell identity and perform channel estimation of the second frequency band using a stream obtained from the second cell identity.

15. The mobile station device according to claim 9, wherein the reception unit comprises:
    a data extraction unit configured to extract a first control signal by descrambling the first reception signal using the first cell identity and extract a second control signal by descrambling the second reception signal using the second cell identity.

16. The mobile station device according to claim 9, comprising:
    a mobile station-related reference signal generation unit configured to generate a third reference signal using the first cell identity and generate a fourth reference signal using the second cell identity; and
    a mobile station-transmission unit configured to transmit a signal including the third reference signal using a third frequency band corresponding to the first frequency band and transmit a signal including the fourth reference signal using a fourth frequency band corresponding to the second frequency band.

17. A communication system which performs communication between a base station device configuring at least one cell and a mobile station device, wherein:
the base station device comprises:
a synchronization signal generation unit configured to generate a synchronization signal corresponding to a first cell identity for identifying the at least one cell; and
a transmission unit configured to generate a first transmission signal including the synchronization signal using a first parameter obtained from the first cell identity, generate a second transmission signal using a second parameter obtained from a second cell identity different from the first cell identity, transmit the first transmission signal using a first frequency band, and transmit the second transmission signal via a second frequency band different from the first frequency band, and
the mobile station device comprises:
a reception unit configured to receive a first reception signal including the synchronization signal using the first parameter obtained from the first cell identity via the first frequency band and receive a second reception signal using the second parameter obtained from the second cell identity via the second frequency band.

18. A communication method for use in a communication system which performs communication between a base station device configuring at least one cell and a mobile station device, the communication method comprising:
generating a synchronization signal corresponding to a first cell identity for identifying the at least one cell;
generating a first transmission signal including the synchronization signal using a first parameter obtained from the first cell identity, generating a second transmission signal using a second parameter obtained from a second cell identity different from the first cell identity, transmitting the first transmission signal using a first frequency band, and transmitting the second transmission signal via a second frequency band different from the first frequency band; and
receiving a first reception signal including the synchronization signal using the first parameter obtained from the first cell identity via the first frequency band and receiving a second reception signal using the second parameter obtained from the second cell identity via the second frequency band.

19. A base station device which communicates with a mobile station device by configuring at least one cell, the base station device comprising:
a synchronization signal generation unit configured to generate a synchronization signal corresponding to a first cell identity for identifying the at least one cell; and
a transmission unit configured to generate a first transmission signal including the synchronization signal using a first parameter obtained from the first cell identity, generate a second transmission signal using a second parameter different from the first parameter, transmit the first transmission signal using a first frequency band, and transmit the second transmission signal using a second frequency band different from the first frequency band.

20. A mobile station device which communicates with a base station device configuring at least one cell, the mobile station device comprising:
a reception unit configured to receive a first reception signal including a synchronization signal corresponding to a cell identity for identifying a cell using a first parameter obtained from the cell identity via a first frequency band and receive a signal using a second parameter different from the first parameter via a second frequency band; and
a data extraction unit configured to extract information indicating the second parameter from the first reception signal.

* * * * *